(12) United States Patent
Hirase et al.

(10) Patent No.: US 7,139,315 B2
(45) Date of Patent: Nov. 21, 2006

(54) APPARATUS AND PROCESS FOR DECODING MOTION PICTURES

(75) Inventors: Katsunori Hirase, Neyagawa (JP); Shinichi Matsuura, Otsu (JP); Hirotsugu Murashima, Yamatotakada (JP); Akihiko Yamashita, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 331 days.

(21) Appl. No.: 10/847,356

(22) Filed: May 18, 2004

(65) Prior Publication Data

US 2004/0213344 A1   Oct. 28, 2004

Related U.S. Application Data

(62) Division of application No. 09/216,855, filed on Dec. 21, 1998, now abandoned.

(30) Foreign Application Priority Data

| Dec. 25, 1997 | (JP) | ................................... 9-357361 |
| Dec. 25, 1997 | (JP) | ................................... 9-357362 |
| Feb. 25, 1998 | (JP) | ................................. 10-044027 |
| Jun. 17, 1998 | (JP) | ................................. 10-169873 |

(51) Int. Cl.
    *H04N 7/12* (2006.01)

(52) U.S. Cl. .............. 375/240.2; 375/240; 375/240.01; 375/240.12

(58) Field of Classification Search ............. 375/240.2, 375/240, 240.01, 240.12
See application file for complete search history.

(56) References Cited

U.S. PATENT DOCUMENTS

| 5,614,952 A | 3/1997 | Boyce et al. |
| 5,646,686 A | 7/1997 | Pearlstein |
| 6,061,402 A * | 5/2000 | Boyce et al. ............... 375/240 |
| 6,104,753 A | 8/2000 | Kim et al. |

FOREIGN PATENT DOCUMENTS

| EP | 0 707 426 A2 | 4/1996 |
| EP | 0 782 345 A2 | 7/1997 |
| GB | 2 310 101 A | 8/1997 |
| JP | 06-022291 | 1/1994 |
| JP | 06-133297 | 5/1994 |

(Continued)

OTHER PUBLICATIONS

WO 93/17523, published Sep. 2, 1993.

(Continued)

*Primary Examiner*—Allen Wong
(74) *Attorney, Agent, or Firm*—Arent Fox PLLC

(57) ABSTRACT

A motion picture decoding apparatus according to the invention includes: a coefficient reducing circuit for removing orthogonal transform coefficients for high horizontal frequencies from a certain sized block of orthogonal transform coefficients obtained from an input signal, thereby reducing the number of transform coefficients to half; an inverse orthogonal transformation circuit for performing an inverse orthogonal transform operation by using the transform coefficients reduced by the coefficient reducing circuit, thereby obtaining, on a block-by-block basis, reconstructed image data or time-axis prediction error data horizontally compressed to ½; an adder for generating reconstructed image data horizontally compressed to ½, based on the time-axis prediction error data provided by the inverse orthogonal transformation circuit and on predetermined reference image data; and one or more than one reference image memories for storing reconstructed image data which is included in the reconstructed image data provided by the inverse orthogonal transformation circuit or the adder and is needed for generating the reference image data.

10 Claims, 15 Drawing Sheets

FOREIGN PATENT DOCUMENTS

| | | |
|---|---|---|
| JP | 06-209463 | 7/1994 |
| JP | 06-225268 | 8/1994 |
| JP | 09/247673 | 9/1997 |
| JP | 09-252469 | 9/1997 |
| JP | 06-261635 | 10/1997 |

OTHER PUBLICATIONS

"A Motion Compensation Technique for Down-Scaled Pictures in Layered Coding", Iwahashi et al, *IEICE Transactions on Communications*, vol. E77-B, No. 8, Aug. 1994, pp. 1007-1012.

* cited by examiner

FIG. 14

| HADAMARD COEFFICIENT K | QUANTIZED VALUE K' | DEQUANTIZED VALUE (REPRESENTATIVE VALUE) K'' |
|---|---|---|
| −128～−87 (−128～−29) | −8 | −93 (−34) |
| −86～−69 (−28～−25) | −7 | −77 (−26) |
| −68～−53 (−24～−21) | −6 | −60 (−22) |
| −52～−39 (−20～−17) | −5 | −45 (−18) |
| −38～−27 (−16～−13) | −4 | −32 (−14) |
| −26～−17 (−12～−9) | −3 | −18 (−10) |
| −16～−9 (−8～−5) | −2 | −12 (−6) |
| −8～−5 (−4～−3) | −1 | −6 (−3) |
| −4～+4 (−2～+2) | 0 | 0 (0) |
| +5～+8 (+3～+4) | +1 | +6 (+3) |
| +9～+16 (+5～+8) | +2 | +12 (+6) |
| +17～+26 (+9～+12) | +3 | +18 (+10) |
| +27～+38 (+13～+16) | +4 | +32 (+14) |
| +39～+52 (+17～+20) | +5 | +45 (+18) |
| +53～+68 (+21～+24) | +6 | +60 (+22) |
| +69～+127 (+25～+127) | +7 | +84 (+32) |

FIG. 15

| HADAMARD COEFFICIENT K | QUANTIZED VALUE K' | DEQUANTIZED VALUE (REPRESENTATIVE VALUE) K" |
|---|---|---|
| -128~-61 (-128~-31) | -4 | -70 (-35) |
| -60~-41 (-30~-21) | -3 | -50 (-25) |
| -40~-21 (-20~-11) | -2 | -30 (-15) |
| -20~-9 (-10~-5) | -1 | -14 (-7) |
| -8~+8 (-4~+4) | 0 | 0 (0) |
| +9~+20 (+5~+10) | +1 | -14 (-7) |
| +21~+40 (+11~+20) | +2 | -30 (-15) |
| +41~+127 (+21~+127) | +3 | -60 (-30) |

FIG. 16

| HADAMARD COEFFICIENT K | QUANTIZED VALUE K' | DEQUANTIZED VALUE (REPRESENTATIVE VALUE) K" |
|---|---|---|
| -128~-17 (-128~-9) | -2 | -18 (-14) |
| -16~-11 (-8~-5) | -1 | -13 (-6) |
| -10~+10 (-4~+4) | 0 | 0 (0) |
| +11~+127 (+5~+127) | +1 | +15 (+12) |

APPARATUS AND PROCESS FOR DECODING MOTION PICTURES

This is a divisional application which claims the benefit of U.S. patent application Ser. No. 09/216,855, filed Dec. 21, 1998 now abandoned. The disclosure of the prior application is hereby incorporated herein in its entirety by reference.

BACKGROUND OF THE INVENTION

1. Field of the Invention

The present invention relates generally to an apparatus for decoding motion pictures and more particularly, to a motion picture decoding apparatus and process which are suitable for decoding signals compression coded based on the MPEG Standards for providing reconstructed pictures of lower resolutions than original pictures.

2. Prior Art

The MPEG (Moving Picture Experts Group) Standards have heretofore been known to fields, such as digital television and the like, as the system for image data compression coding.

The MPEG Standards typically include the MPEG-1 Standard and the MPEG-2 Standard. The MPEG-1 Standard handles only progressively scanned pictures (noninterlace scan) whereas the MPEG-2 Standard handles zigzag scanned pictures (interlace scan) as well as progressively scanned pictures.

The MPEG coding process includes motion compensated prediction (time based compression), DCT (space based compression) and entropy coding (variable length coding). In the MPEG coding process, predictive coding is first performed along the time axis on a macroblock basis (predictive frame coding is performed under the MPEG-1 Standard whereas the predictive frame coding or predictive field coding is performed under the MPEG-2 Standard).

The macroblock includes a 16 (number of horizontal pixels)×16 (number of vertical pixels) block of Y-signal (luminance signal), a 8(number of horizontal pixels)×8 (number of vertical pixels) block of Cb-signal (color difference signal), and a 8(number of horizontal pixels)×8(number of vertical pixels) block of Cr-signal (color difference signal).

To facilitate the explanation, only the Y signal will be described. There are three picture types of "I" Picture, "P" Picture and "B" Picture depending upon the predictive coding processes. The following description will be made by way of example of the predictive frame coding.

(1) "I" Picture is coded using only information present in the frame and is not dependent upon interframe prediction. All the macroblocks of the "I" Picture depend upon the predictive intraframe coding based only on the information resident in the frame.

(2) "P" Picture is coded by prediction from the closest past "I" or "P" Picture. The macroblocks of the "P" Picture normally involve both intraframe coding using only the information present in the frame and forward predictive interframe-coding based on prediction from a past reconstructed picture.

(3) "B" Picture is coded based on bidirectional prediction and normally includes the following macroblock types.

a. a predictive intra-coded block based on only the information present in the frame;

b. a forward predictive interframe-coded block based on prediction from the closest past reconstructed picture;

c. a backward predictive interframe-coded block based on prediction from the closest future picture; and d. an interpolative/predictive interframe-coded block based on bidirectional prediction.

It is to be noted here that the interpolative interframe prediction means to average a forward prediction and a backward prediction for two corresponding pixels.

In an MPEG decoder, image data for an original picture is divided into 16 (number of horizontal pixels)×16(number of vertical pixels) macroblocks. Except for the predictive intraframe coded macroblock, the respective macroblocks are subject to any one of the interframe prediction operations according to the macroblock type thereof for generation of prediction error data therefor.

An image data macroblock (the predictive intraframe coded macroblock) or a prediction error data macroblock (the predictive interframe coded macroblock) is divided into four 8×8 sized sub-blocks. Each image data sub-block is processed based on a two-dimensional discrete cosine transform (DCT) operation, a kind of orthogonal transformation process, using the following equation (1):

$$F(u, v) = \frac{1}{4} \cdot C(u)C(v) \sum_{i=0}^{7} \sum_{j=0}^{7} f(i, j) \times \cos\left\{\frac{(2i+1)u\pi}{16}\right\} \cos\left\{\frac{(2j+1)v\pi}{16}\right\} \quad (1)$$

wherein $i, u = 0, 1, 2, \ldots 7$ $j, v = 0, 1, 2, \ldots 7$ $$C(u), C(v) = \begin{cases} 1/\sqrt{2} & (u = 0 \text{ or } v = 0) \\ 1 & (u \neq 0, v \neq 0) \end{cases}$$

More specifically, DCT (orthogonal transform) coefficients F for a uv space (u:horizontal frequency, v:vertical frequency) are respectively determined based on the 8×8 sub-block of data pieces f (i,j), as shown in FIG. 2.

The MPEG-1 Standard supports only a DCT frame mode whereas a frame structure under the MPEG-2 Standard permits the switching between the DCT frame mode and a DCT field mode on a macroblock basis. However, a field structure under the MPEG-2 Standard supports only the DCT field mode.

In the DCT frame mode, the 16×16 macroblock is divided into four sub-blocks so that the DCT operation is performed on a 8×8 sub-block basis: an upper-left 8×8 sub-block, an upper-right 8×8 sub-block, a lower-left 8×8 sub-block and a lower-right 8×8 sub-block.

In the DCT field mode, on the other hand, the DCT operation is performed on a data group consisting of only odd-numbered lines of a left-half 8 (number of horizontal pixels)×16 (number of vertical pixels) block of the 16×16 macroblock or being worth of the 8×8 sub-block, a data group consisting of only even-numbered lines of the left-half 8×16 block of the 16×16 macroblock or being worth of the 8×8 sub-block, a data group consisting of only odd-numbered lines of a right-half 8 (number of horizontal pixels)×16 (number of vertical pixels) block of the 16×16 macroblock or being worth of the 8×8 sub-block, and a data group consisting of only even-numbered lines of the right-half 8×16 block of the 16×16 macroblock or being worth of the 8×8 sub-block.

The DCT coefficients determined in the aforementioned manner are quantized to provide quantized DCT coefficients. The quantized DCT coefficients are zigzag scanned or alternate scanned to a one dimensional sequence of coefficients so as to be encoded by a variable length encoder. An MPEG encoder outputs variable length coded transform coefficients provided by the variable length encoder as well as control information including information indicative of the macroblock type, and variable length coded motion vectors.

FIG. 1 is a block diagram showing a construction of the MPEG decoder.

A variable length coded transform coefficient is sent to a variable length decoder 101 whereas a control signal including the macroblock type is sent to a CPU 110. A variable length coded motion vector is sent to a variable length decoder 109 so as to be decoded. A motion vector provided by the variable length decoder 109 is represented in half pels rather than in full pels. The variable length decoder 109 supplies the motion vector to a first reference image memory 106 and a second reference image memory 107 as a control signal for controlling a slicing position of a reference image, while also supplying the motion vector to a first motion compensation circuit 121 and a second motion compensation circuit 122 as a motion compensation signal.

The variable length decoder 101 serves to decode the variable length coded transform coefficient. An inverse quantizer 102 serves to inversely quantize the transform coefficient (quantized DCT coefficient) supplied from the variable length decoder 101 for transformation into the DCT coefficient.

An inverse DCT circuit 103 transforms the DCT coefficient sequence, provided by the inverse quantizer 102, back to the 8×8 sub-block of DCT coefficients and performs an 8×8 sub-block based inverse DCT operation by using the following inverse transformation equation (2):

$$f(i, j) = \frac{1}{4} \cdot \sum_{u=0}^{7} \sum_{v=0}^{7} C(u)C(v)F(u, v) \times \cos\left\{\frac{(2i+1)u\pi}{16}\right\}\cos\left\{\frac{(2j+1)v\pi}{16}\right\} \quad (2)$$

wherein $i, u = 0, 1, 2, \ldots 7$ $j, v = 0, 1, 2, \ldots 7$ $C(u), C(v) = \begin{cases} 1/\sqrt{2} & (u = 0 \text{ or } v = 0) \\ 1 & (u \neq 0, v \neq 0) \end{cases}$ More specifically, the 8×8 sub-block of data f (i,j) is obtained from the 8×8 sub-block of DCT coefficients F(u,v) as shown in FIG. 2. Further, the reconstructed image data macroblock or prediction error data macroblock is generated by using four sub-blocks of data f (i,j).

An adder 104 processes the prediction error data macroblock provided by the inverse DCT circuit 103 by adding thereto reference image data according to the macroblock type of the prediction error data, thereby generating the reconstructed image data. The reference image data is sent to the adder 104 via a switch 112. It is noted that in a case where the inverse DCT circuit 103 outputs the reconstructed image data for predictive intraframe coding, no reference image data is added.

Where the image data macroblock provided by the inverse DCT circuit 103 or the adder 104 is reconstructed image data for "B" Picture, the reconstructed image data is sent to a switch 113.

Where the reconstructed image data macroblock provided by the inverse DCT circuit 103 or the adder 104 is reconstructed image data for "I" or "P" Picture, the reconstructed image data is committed to storage at the first reference image memory 106 or the second reference image memory 107 via a switch 111. The switch 111 is controlled by, the CPU 110.

The first and second motion compensation circuits 121, 122 each perform a half pel motion compensation operation on the reference image read from the reference image memory 106 or 107 based on a half pel motion vector supplied from the variable length decoder 109.

If a predicted pixel is located between two adjacent pixels, an average value of the two pixels is determined so that the resultant average value is used as a value of the predicted pixel. If the predicted pixel is surrounded by four pixels, an average value f the four pixels is determined so that the resultant average value is used as a value of the predicted pixel.

Respective values G1 to G5 of predicted pixels G1 to G5 are given by the following equations (3) wherein four neighboring pixels in an image read from the reference image memory 106 or 107 are represented by A, B, C and D, respectively:

$G1 = (A+B)/2$ $G2 = (A+C)/2$ $G3 = (A+B+C+D)/4 \quad (3)$ $G4 = (B+D)/2$ $G5 = (C+D)/2$ An averaging section 108 averages the reconstructed image data provided by the first and the second motion compensation circuits 121, 122 for generating the reference image data for use in the interpolative/predictive interframe coding.

The switch 112 is controlled by the CPU 110 in the following manner. A common terminal of the switch 112 is switched to an earth terminal when the inverse DCT circuit 103 outputs reconstructed image data for predictive intraframe coding.

When an output of the inverse DCT circuit 103 is either prediction error data for forward predictive interframe coding or prediction error data for backward predictive interframe coding, the common terminal of the switch 112 is switched to select either a terminal for receiving an output from the first motion compensation circuit 121 or a terminal for receiving an output from the second motion compensation circuit 122.

When an output of the inverse DCT circuit 103 is prediction error data for interpolative/predictive interframe coding, the common terminal of the switch 112 is switched to select a terminal for receiving an output from the averaging section 108.

The switch 113 is controlled by the CPU 110 in a manner to output the reconstructed image data for "B" Picture supplied from the adder 104, the reconstructed image data for "I" or "P" Picture stored in the first reference image memory 106, and the reconstructed image data for "I" or "P" Picture stored in the second reference image memory 107 in an order corresponding to the original picture. The image data outputted from the decoder is applied to a monitor device which, in turn, displays a reconstructed image on its display screen.

SUMMARY OF THE INVENTION

The prior-art MPEG decoder abovementioned suffers great memory requirements because two screens worth of reference image data must be stored.

The present inventors have studied aiming at the reduction of the memory requirements and developed a technique for reproducing pictures horizontally compressed to half relative to the original pictures through an inverse DCT process using only DCT coefficients for low horizontal frequencies. It should be appreciated that this technique has not yet been laid open and hence, should not be regarded as the prior art.

Where the resultant image horizontally compressed to half is used as the reference image, a horizontal value of the motion vector may be reduced to half prior to the motion compensation operation. In this case, the resultant horizontal value of the motion vector is represented in ½ pels by dropping a fractional portion less than ½ pel so as to be subjected to the motion compensation based on the conventional arithmetic operation (see the aforementioned equations (3)).

That is, as shown in FIG. 4, the respective values G1 to G5 of the predicted pixels G1 to G5 are determined by using the aforementioned equations (3) wherein A to D denote pixel values of the four neighboring pixels A to D included in the image horizontally compressed to half and read from the reference image memory.

This permits the motion compensation operation to be performed on the image horizontally compressed to ½ with a horizontal accuracy of ½ pel. Unfortunately, however, a distance between horizontally adjoining pixels in the image horizontally compressed to ½ accounts for two pixels in real terms and hence, an actual accuracy of the horizontal motion compensation is 1 pel. As a result, the motion compensation suffers lowered accuracies with respect to the horizontal direction.

It is therefore, a first object of the invention to provide a motion picture decoding apparatus and process permitting the reduction of memory requirements.

A second object of the invention is to provide a motion picture decoding apparatus and process designed to prevent the reduction of motion compensation accuracy in the process in which a signal compression coded based on the MPEG Standards is decoded to provide a reconstructed image compressed from the original picture with respect to either one of or both of the horizontal and vertical directions.

A first motion picture decoding apparatus according to the invention comprises: a coefficient reducing circuit for removing orthogonal transform coefficients for high horizontal frequencies from a certain sized block of orthogonal transform coefficients obtained from an input signal, thereby reducing the number of transform coefficients to half; an inverse orthogonal transformation circuit for performing an inverse orthogonal transform operation by using the transform coefficients reduced by the coefficient reducing circuit, thereby obtaining, on a block-by-block basis, reconstructed image data or time-axis prediction error data horizontally compressed to ½; an adder for generating reconstructed image data horizontally compressed to ½, based on the time-axis prediction error data provided by the inverse orthogonal transformation circuit and on predetermined reference image data; and one or more than one reference image memories for storing reconstructed image data which is included in the reconstructed image data provided by the inverse orthogonal transformation circuit or the adder and is needed for generating the reference image data.

The aforesaid certain sized block is based on an MXN block unit including an M number of horizontal pixels and an N number of vertical pixels, and the inverse orthogonal transformation circuit performs the inverse orthogonal transform operation based on the following equation (5) provided that an original picture has been encoded by an orthogonal transform operation based on the following equation (4):

$$F(u, v) = \frac{2}{\sqrt{M}\sqrt{N}} \cdot C(u)C(v) \sum_{i=0}^{M-1} \sum_{j=0}^{N-1} f(i, j) \times \cos\left\{\frac{(2i+1)u\pi}{2M}\right\} \cos\left\{\frac{(2j+1)v\pi}{2N}\right\} \quad (4)$$

wherein
$i, u = 0, 1, 2, \ldots (M-1)$
$j, v = 0, 1, 2, \ldots (N-1)$
$$C(u), C(v) = \begin{cases} 1/\sqrt{2} & (u = 0 \text{ or } v = 0) \\ 1 & (u \neq 0, v \neq 0) \end{cases}$$

$$f(i, j) = \frac{2}{\sqrt{M}\sqrt{N}} \cdot \sum_{u=0}^{\frac{M}{2}-1} \sum_{v=0}^{N-1} C(u)C(v)F(u, v) \times \cos\left\{\frac{(2i+1)u\pi}{2 \cdot M/2}\right\} \cos\left\{\frac{(2j+1)v\pi}{2N}\right\} \quad (5)$$

wherein
$i, u = 0, 1, 2, \ldots (M/2-1)$
$j, v = 0, 1, 2, \ldots (N-1)$
$$C(u), C(v) = \begin{cases} 1/\sqrt{2} & (u = 0 \text{ or } v = 0) \\ 1 & (u \neq 0, v \neq 0) \end{cases}$$

The aforesaid certain sized block is based on an 8×8 block unit including 8 horizontal pixels and 8 vertical pixels, and the inverse orthogonal transformation circuit performs the inverse orthogonal transform operation based on the following equation (7) provided that an original picture has been encoded by an orthogonal transform operation based on the following equation (6):

$$F(u, v) = \frac{1}{4} \cdot C(u)C(v) \sum_{i=0}^{7} \sum_{j=0}^{7} f(i, j) \times \cos\left\{\frac{(2i+1)u\pi}{16}\right\} \cos\left\{\frac{(2j+1)v\pi}{16}\right\} \quad (6)$$

wherein
$i, u = 0, 1, 2, \ldots 7$
$j, v = 0, 1, 2, \ldots 7$
$$C(u), C(v) = \begin{cases} 1/\sqrt{2} & (u = 0 \text{ or } v = 0) \\ 1 & (u \neq 0, v \neq 0) \end{cases}$$

$$f(i, j) = \frac{1}{4} \cdot \sum_{u=0}^{3} \sum_{v=0}^{7} C(u)C(v)F(u, v) \times \cos\left\{\frac{(2i+1)u\pi}{8}\right\} \cos\left\{\frac{(2j+1)v\pi}{16}\right\} \quad (7)$$

wherein
$i, u = 0, 1, 2, 3$
$j, v = 0, 1, 2, \ldots 7$
$$C(u), C(v) = \begin{cases} 1/\sqrt{2} & (u = 0 \text{ or } v = 0) \\ 1 & (u \neq 0, v \neq 0) \end{cases}$$

It is preferred that the motion picture decoding apparatus according to the invention further comprises a motion compensation circuit for performing a motion compensation operation on image data of a certain size with a horizontal accuracy of ¼ pel and a vertical accuracy of ½ pel, the image data read from the reference image memory for generation of the reference image data and horizontally compressed to ½ relative to an original picture.

A second motion picture decoding apparatus according to the invention comprises: a coefficient reducing circuit for removing orthogonal transform coefficients for high horizontal frequencies from a certain sized block of orthogonal transform coefficients obtained from an input signal, thereby reducing the number of transform coefficients to half; an inverse orthogonal transformation circuit for performing an inverse orthogonal transform operation by using the transform coefficients reduced by the coefficient reducing circuit, thereby obtaining, on a block-by-block basis, reconstructed image data or time-axis prediction error data horizontally compressed to ½; an adder for generating reconstructed image data horizontally compressed to ½, based on the time-axis prediction error data provided by the inverse orthogonal transformation circuit and on predetermined reference image data; a vertical deletion circuit for deleting a half of the horizontal lines of the reconstructed image data supplied from the inverse orthogonal transformation circuit or the adder, thereby generating reconstructed image data compressed to ½ with respect to the horizontal and vertical directions, respectively; and one or more than one reference image memories for storing reconstructed image data which is included in the reconstructed image data provided by the vertical deletion circuit and is needed for generating the reference image data, the motion picture decoding apparatus wherein the reconstructed image data stored in the reference image memory is used for generating the reference image data compressed to ½ only with respect to the horizontal direction.

The aforesaid certain sized block is based on an MXN block unit including an M number of horizontal pixels and an N number of vertical pixels, and the inverse orthogonal transformation circuit performs the inverse orthogonal transform operation based on the following equation (9) provided that an original picture has been encoded by an orthogonal transform operation based on the following equation (8):

$$F(u, v) = \frac{2}{\sqrt{M}\sqrt{N}} \cdot C(u)C(v) \sum_{i=0}^{M-1} \sum_{j=0}^{N-1} f(i, j) \times \cos\left\{\frac{(2i+1)u\pi}{2M}\right\} \cos\left\{\frac{(2j+1)v\pi}{2N}\right\} \quad (8)$$

wherein
$i, u = 0, 1, 2, \ldots (M-1)$
$j, v = 0, 1, 2, \ldots (N-1)$
$C(u), C(v) = \begin{cases} 1/\sqrt{2} & (u = 0 \text{ or } v = 0) \\ 1 & (u \neq 0, v \neq 0) \end{cases}$ -continued $$f(i, j) = \frac{2}{\sqrt{M}\sqrt{N}} \cdot \sum_{u=0}^{\frac{M}{2}-1} \sum_{v=0}^{N-1} C(u)C(v)F(u, v) \times \cos\left\{\frac{(2i+1)u\pi}{2 \cdot M/2}\right\} \cos\left\{\frac{(2j+1)v\pi}{2N}\right\} \quad (9)$$

wherein
$i, u = 0, 1, 2, \ldots (M/2 - 1)$
$j, v = 0, 1, 2, \ldots (N - 1)$
$C(u), C(v) = \begin{cases} 1/\sqrt{2} & (u = 0 \text{ or } v = 0) \\ 1 & (u \neq 0, v \neq 0) \end{cases}$ The aforesaid certain sized block is based on an 8×8 block unit including 8 horizontal pixels and 8 vertical pixels, and the inverse orthogonal transformation circuit performs the inverse orthogonal transform operation based on the following equation (11) provided that an original picture has been encoded by an orthogonal transform operation based on the following equation (10):

$$F(u, v) = \frac{1}{4} \cdot C(u)C(v) \sum_{i=0}^{7} \sum_{j=0}^{7} f(i, j) \times \cos\left\{\frac{(2i+1)u\pi}{16}\right\} \cos\left\{\frac{(2j+1)v\pi}{16}\right\} \quad (10)$$

wherein
$i, u = 0, 1, 2, \ldots 7$
$j, v = 0, 1, 2, \ldots 7$
$C(u), C(v) = \begin{cases} 1/\sqrt{2} & (u = 0 \text{ or } v = 0) \\ 1 & (u \neq 0, v \neq 0) \end{cases}$ $$f(i, j) = \frac{1}{4} \cdot \sum_{u=0}^{3} \sum_{v=0}^{7} C(u)C(v)F(u, v) \times \cos\left\{\frac{(2i+1)u\pi}{8}\right\} \cos\left\{\frac{(2j+1)v\pi}{16}\right\} \quad (11)$$

wherein
$i, u = 0, 1, 2, 3$
$j, v = 0, 1, 2, \ldots 7$
$C(u), C(v) = \begin{cases} 1/\sqrt{2} & (u = 0 \text{ or } v = 0) \\ 1 & (u \neq 0, v \neq 0) \end{cases}$ The aforesaid vertical deletion circuit performs a vertical deletion processing by vertically deleting, at regular intervals, two successive horizontal lines in every four successive horizontal lines of the reconstructed image data provided by the inverse orthogonal transformation circuit or the adder.

It is preferred that the motion picture decoding apparatus according to the invention further comprises a motion compensation circuit for performing a motion compensation operation on image data of a certain size with a horizontal accuracy of ¼ pel and a vertical accuracy of ½ pel, the image data read from the reference image memory for generation of the reference image data and horizontally compressed to ½ relative to an original picture.

A third motion picture decoding apparatus according to the invention comprises: a coefficient reducing circuit for removing orthogonal transform coefficients for high horizontal frequencies from a certain sized block of orthogonal transform coefficients obtained from an input signal, thereby reducing the number of transform coefficients to half; an inverse orthogonal transformation circuit for performing an inverse orthogonal transform operation by using the transform coefficients reduced by the coefficient reducing circuit, thereby obtaining, on a block-by-block basis, first reconstructed image data or time-axis prediction error data horizontally compressed to ½; an adder for generating first reconstructed image data horizontally compressed to ½, based on the time-axis prediction error data provided by the inverse orthogonal transformation circuit and on predetermined reference image data; an Hadamard transformation coding circuit for quantizing, based on Hadamard transformation, the first reconstructed image data provided by the inverse orthogonal transformation circuit or the adder, thereby generating second reconstructed image data, the amount of which data is reduced bitwise to ½ from that of the first reconstructed image data; and one or more than one reference image memories for storing second reconstructed image data which is included in the second reconstructed image data provided by the Hadamard transformation coding circuit and is needed for generating the reference image data, the motion picture decoding apparatus wherein the second reconstructed image data stored in the reference image memory is used for generating the reference image data corresponding to the first reconstructed image data.

The aforesaid certain sized block is based on an MXN block unit including an M number of horizontal pixels and an N number of vertical pixels, and the inverse orthogonal transformation circuit performs the inverse orthogonal transform operation based on the following equation (13) provided that an original picture has been encoded by an orthogonal transform operation based on the following equation (12):

$$F(u, v) = \frac{2}{\sqrt{M}\sqrt{N}} \cdot C(u)C(v) \sum_{i=0}^{M-1} \sum_{j=0}^{N-1} f(i, j) \times \cos\left\{\frac{(2i+1)u\pi}{2M}\right\}\cos\left\{\frac{(2j+1)v\pi}{2N}\right\} \quad (12)$$

wherein
$i, u = 0, 1, 2, \ldots (M-1)$
$j, v = 0, 1, 2, \ldots (N-1)$
$C(u), C(v) = \begin{cases} 1/\sqrt{2} & (u = 0 \text{ or } v = 0) \\ 1 & (u \neq 0, v \neq 0) \end{cases}$ $$f(i, j) = \frac{2}{\sqrt{M}\sqrt{N}} \cdot \sum_{u=0}^{\frac{M}{2}-1} \sum_{v=0}^{N-1} C(u)C(v)F(u, v) \times \cos\left\{\frac{(2i+1)u\pi}{2 \cdot M/2}\right\}\cos\left\{\frac{(2j+1)v\pi}{2N}\right\} \quad (13)$$

wherein
$i, u = 0, 1, 2, \ldots (M/2-1)$
$j, v = 0, 1, 2, \ldots (N-1)$
$C(u), C(v) = \begin{cases} 1/\sqrt{2} & (u = 0 \text{ or } v = 0) \\ 1 & (u \neq 0, v \neq 0) \end{cases}$ The aforesaid certain sized block is based on an 8×8 block unit including 8 horizontal pixels and 8 vertical pixels, and the inverse orthogonal transformation circuit performs the inverse orthogonal transform operation based on the following equation (15) provided that an original picture has been encoded by an orthogonal transform operation based on the following equation (14):

$$F(u, v) = \frac{1}{4} \cdot C(u)C(v) \sum_{i=0}^{7} \sum_{j=0}^{7} f(i, j) \times \cos\left\{\frac{(2i+1)u\pi}{16}\right\}\cos\left\{\frac{(2j+1)v\pi}{16}\right\} \quad (14)$$

wherein
$i, u = 0, 1, 2, \ldots 7$
$j, v = 0, 1, 2, \ldots 7$
$C(u), C(v) = \begin{cases} 1/\sqrt{2} & (u = 0 \text{ or } v = 0) \\ 1 & (u \neq 0, v \neq 0) \end{cases}$ $$f(i, j) = \frac{1}{4} \cdot \sum_{u=0}^{3} \sum_{v=0}^{7} C(u)C(v)F(u, v) \times \cos\left\{\frac{(2i+1)u\pi}{8}\right\}\cos\left\{\frac{(2j+1)v\pi}{16}\right\} \quad (15)$$

wherein
$i, u = 0, 1, 2, 3$
$j, v = 0, 1, 2, \ldots 7$
$C(u), C(v) = \begin{cases} 1/\sqrt{2} & (u = 0 \text{ or } v = 0) \\ 1 & (u \neq 0, v \neq 0) \end{cases}$ It is preferred that the motion picture decoding apparatus according to the invention further comprises a motion compensation circuit for performing a motion compensation operation on image data of a certain size with a horizontal accuracy of ¼ pel and a vertical accuracy of ½ pel, the image data read from the reference image memory for generation of the reference image data and horizontally compressed to ½ relative to an original picture.

A fourth motion picture decoding apparatus according to the invention comprises: an inverse orthogonal transformation circuit for performing an inverse orthogonal transform operation on a certain sized block of orthogonal transform coefficients obtained from an input signal, thereby providing first reconstructed image data or time-axis prediction error data; an adder for generating first reconstructed image data based on the time-axis prediction error data provided by the inverse orthogonal transformation circuit and predetermined reference image data; an Hadamard transformation coding circuit for quantizing, based on Hadamard transformation, the first reconstructed image data provided by the inverse orthogonal transformation circuit or the adder, thereby generating second reconstructed image data, the amount of which data is reduced bitwise from that of the first reconstructed image data; and one or more than one reference image memories for storing second reconstructed image data which is included in the second reconstructed image data provided by the Hadamard transformation coding circuit and is needed for generating the reference image data, the motion picture decoding apparatus wherein the second reconstructed image data stored in the reference image memory is used for generating the reference image data corresponding to the first reconstructed image data.

A first motion picture decoding process for decoding a signal compression coded based on the MPEG Standards according to the invention, the process comprising the steps of: a first step of generating reconstructed image data based on image data obtained through an inverse DCT operation using DCT coefficients, a part of which coefficients has been removed, or on a combination of said obtained image data and reference image data; a second step of committing reconstructed image data to storage at a reference image memory, which reconstructed image data is included in the reconstructed image data provided by the first step and is needed for generating the reference image data; and a third step of generating the reference image data based on the reconstructed image data stored in the reference image memory.

A second motion picture decoding process for decoding a signal compression coded based on the MPEG Standards according to the invention, the process comprising the steps of: a first step of generating first reconstructed image data based on image data obtained through an inverse DCT operation using DCT coefficients, a part of which coefficients has been removed, or on a combination of said obtained image data and reference image data; a second step of generating second reconstructed image data by subjecting the first reconstructed image data to at least one of a horizontal deletion processing and a vertical deletion processing; a third step of committing second reconstructed image data to storage at a reference image memory, which reconstructed image data is included in the second reconstructed image data provided by the second step and is needed for generating the reference image data; and a fourth step of generating the reference image data corresponding to the first reconstructed image data by using the second reconstructed image data stored in the reference image memory.

A third motion picture decoding process for decoding a signal compression coded based on the MPEG Standards according to the invention, the process comprising the steps of: a first step of generating first reconstructed image data based on image data obtained through an inverse DCT operation or on a combination of said obtained image data and reference image data; a second step of performing an Hadamard transformation-based coding operation on the first reconstructed image data thereby generating second reconstructed image data, the amount of which data is reduced bitwise from that of the first reconstructed image data; a third step of committing second reconstructed image data to storage at a reference image memory, which reconstructed image data is included in the second reconstructed image data provided by the second step and is needed for generating the reference image data; and a fourth step of generating the reference image data corresponding to the first reconstructed image data by using the second reconstructed image data stored in the reference image memory.

A fourth motion picture decoding process for decoding a signal compression coded based on the MPEG Standards according to the invention, the process comprising the steps of: a first step of generating first reconstructed image data based on image data obtained through an inverse DCT operation using DCT coefficients, a part of which coefficients has been removed, or on a combination of said obtained image data and reference image data; a second step of performing an Hadamard transformation-based coding operation on the first reconstructed image data thereby generating second reconstructed image data, the amount of which data is reduced bitwise from that of the first reconstructed image data; a third step of committing second reconstructed image data to storage at a reference image memory, which reconstructed image data is included in the second reconstructed image data provided by the second step and is needed for generating the reference image data; and a fourth step of generating the reference image data corresponding to the first reconstructed image data by using the second reconstructed image data stored in the reference image memory.

A fifth motion picture decoding process for decoding a signal compression coded based on the MPEG Standards according to the invention, the process comprising the steps of: a first step of generating first reconstructed image data based on image data obtained through an inverse DCT operation using DCT coefficients, a part of which coefficients has been replaced with "0", or on a combination of said obtained image data and reference image data; a second step of performing an Hadamard transformation-based coding operation on the first reconstructed image data thereby generating second reconstructed image data, the amount of which data is reduced bitwise from that of the first reconstructed image data; a third step of committing second reconstructed image data to storage at a reference image memory, which reconstructed image data is included in the second reconstructed image data provided by the second step and is needed for generating the reference image data; and a fourth step of generating the reference image data corresponding to the first reconstructed image data by using the second reconstructed image data stored in the reference image memory.

A sixth motion picture decoding process for decoding a signal compression coded based on the MPEG Standards according to the invention, the process comprising the steps of: a first step of generating first reconstructed image data based on image data obtained through an inverse DCT operation or on a combination of said obtained image data and reference image data; a second step of generating second reconstructed image data by subjecting the first reconstructed image data to at least one of a horizontal deletion processing and a vertical deletion processing; a third step of performing an Hadamard transformation-based coding operation on the second reconstructed image data thereby generating third reconstructed image data, the amount of which data is reduced bitwise from that of the second reconstructed image data; a fourth step of committing third reconstructed image data to storage at a reference image memory, which reconstructed image data is included in the third reconstructed image data provided by the third step and is needed for generating the reference image data; and a fifth step of generating the reference image data corresponding to the first reconstructed image data by using the third reconstructed image data stored in the reference image memory.

A seventh motion picture decoding process for decoding a signal compression coded based on the MPEG Standards according to the invention, the process comprising the steps of: a first step of generating first reconstructed image data based on image data obtained through an inverse DCT operation using DCT coefficients, a part of which coefficients has been removed, or on a combination of said obtained image data and reference image data; a second step of generating second reconstructed image data by subjecting the first reconstructed image data to at least one of a horizontal deletion processing and a vertical deletion processing; a third step of performing an Hadamard transformation-based coding operation on the second reconstructed image data thereby generating third reconstructed image data, the amount of which data is reduced bitwise from that of the second reconstructed image data; a fourth step of committing third reconstructed image data to storage at a reference image memory, which reconstructed image data is included in the third reconstructed image data provided by the third step and is needed for generating the reference image data; and a fifth step of generating the reference image data corresponding to the first reconstructed image data by using the third reconstructed image data stored in the reference image memory.

An eighth motion picture decoding process for decoding a signal compression coded based on the MPEG Standards according to the invention, the process comprising the steps of: a first step of generating first reconstructed image data based on image data obtained through an inverse DCT operation using DCT coefficients, a part of which coefficients has been replaced with "0", or on a combination of said obtained image data and reference image data; a second step of generating second reconstructed image data by subjecting the first reconstructed image data to at least one of a horizontal deletion processing and a vertical deletion processing; a third step of performing an Hadamard transformation-based coding operation on the second reconstructed image data thereby generating third reconstructed image data, the amount of which data is reduced bitwise from that of the second reconstructed image data; a fourth step of committing third reconstructed image data to storage at a reference image memory, which reconstructed image data is included in the third reconstructed image data provided by the third step and is needed for generating the reference image data; and a fifth step of generating the reference image data corresponding to the first reconstructed image data by using the third reconstructed image data stored in the reference image memory.

BRIEF DESCRIPTION OF THE DRAWINGS

FIG. 14 is a schematic diagram showing an exemplary quantization/dequantization table;

FIG. 15 is a schematic diagram showing another exemplary quantization/dequantization table; and FIG. 16 is a schematic diagram showing a still another exemplary quantization/dequantization table.

DETAILED DESCRIPTION OF PREFERRED EMBODIMENTS

[1] First Embodiment

Figure 1:
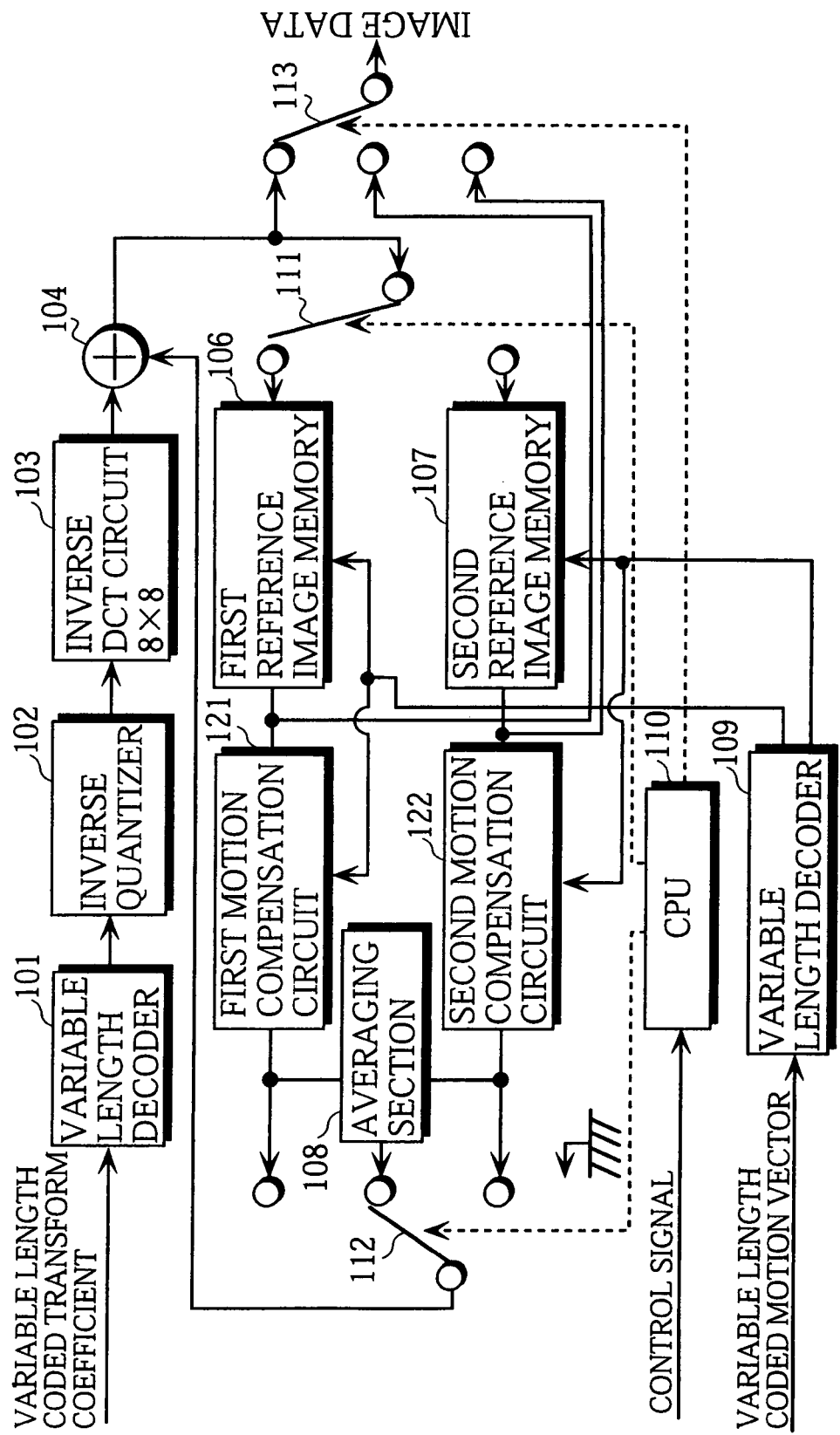
FIG. 1 is a block diagram showing a construction of a prior-art MPEG decoder.
Figure 2:
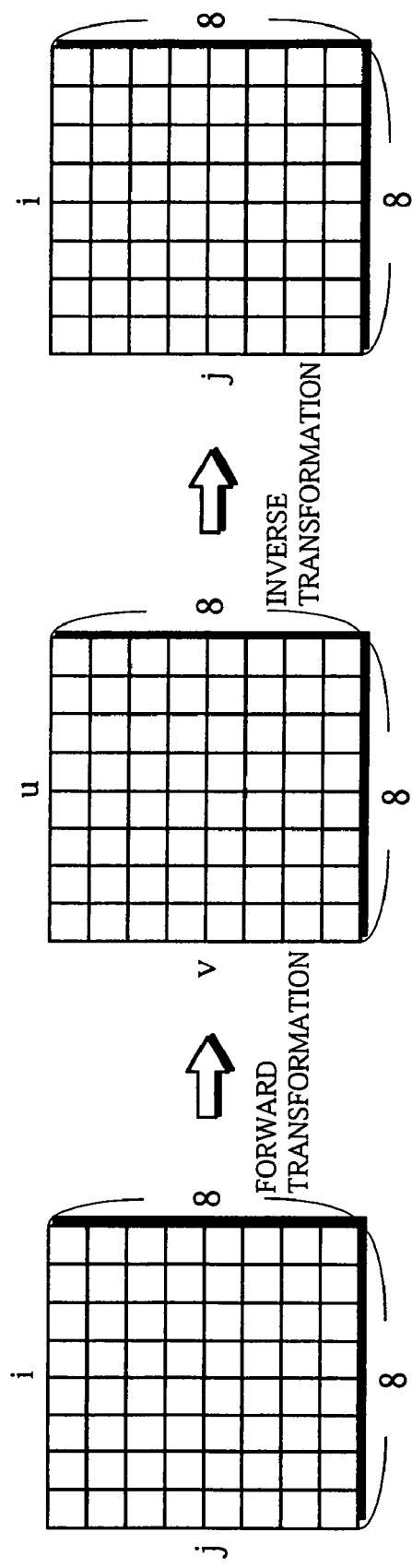
FIG. 2 is a schematic diagram for illustrating a DCT operation and an inverse DCT operation performed by the prior-art MPEG decoder.
Figure 3:
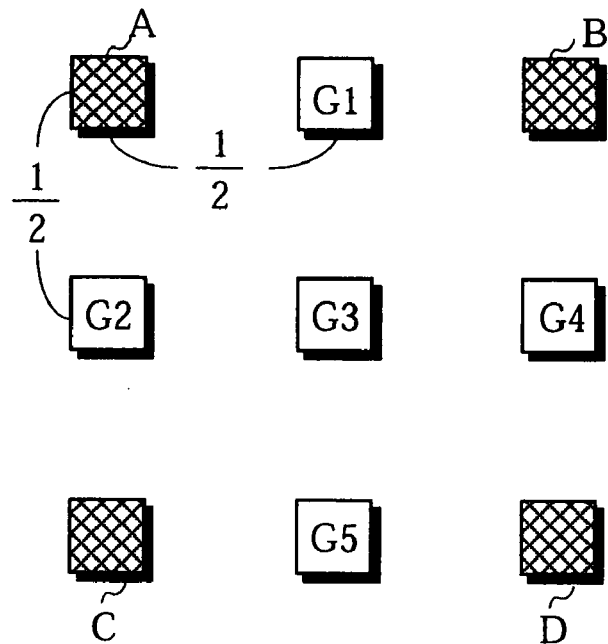
FIG. 3 is a schematic diagram for illustrating an prior-art motion compensation operation.
Figure 4:
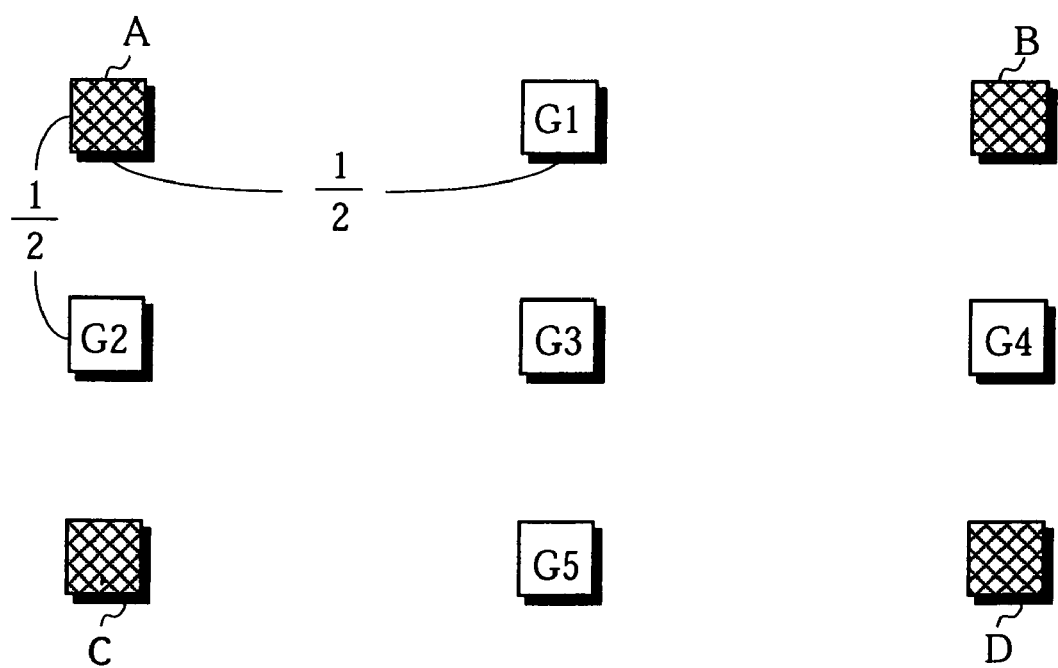
FIG. 4 is a schematic diagram showing a result of the conventional motion compensation operation applied to a motion picture decoding process for reproducing an image compressed relative to an original picture in either one or both of the horizontal and vertical directions.
Figure 5:
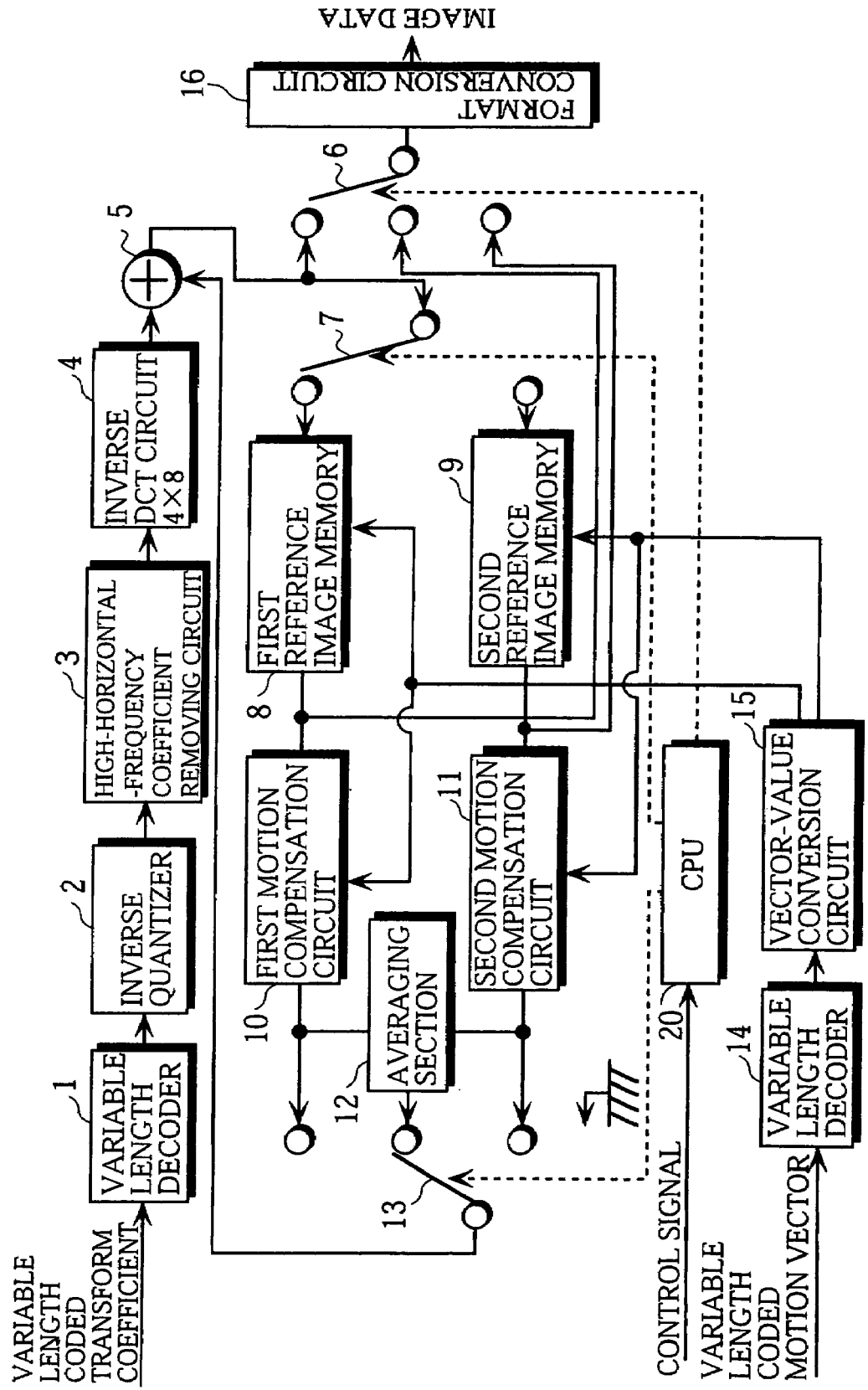
FIG. 5 is a block diagram showing a construction of an MPEG decoder according to a first embodiment of the invention.

Now, a first embodiment of the invention will hereinbelow be described with reference to FIGS. 5 to 7. FIG. 5 diagrammatically illustrates a construction of an MPEG decoder hereof.

A variable length coded transform coefficient is sent to a variable length decoder 1 whereas a control signal inclusive of a macroblock type is sent to a CPU 20. A variable length coded motion vector is supplied to a variable length decoder 14 to be decoded. A motion vector provided by the variable length decoder 14 is represented in half pels rather than in full pels.

According to this embodiment hereof, an image data macroblock is horizontally compressed to ½ and sent to reference image memories 8, 9 which will be described hereinafter. Accordingly, a horizontal value of the motion vector provided by the variable length decoder 14 is reduced to ½ by a vector-value conversion circuit.

The motion vector with its horizontal value reduced to ½ by the vector-value conversion circuit 15 is supplied to the first reference image memory 8 and the second reference image memory 9 as a control signal for controlling a slicing position in a reference image and also to a first motion compensation circuit 10 and a second motion compensation circuit 11 as a motion compensation signal.

The variable length decoder 1 serves to decode the variable length coded transform coefficient. An inverse quantizer 2 inversely quantizes the transform coefficient (quantized DCT coefficient) supplied by the variable length decoder 1 thereby transforming the coefficient back to the DCT coefficient. A high-horizontal-frequency coefficient removing circuit (coefficient reducing circuit) 3 transforms a DCT coefficient sequence produced by the inverse quantizer 2 back to 8×8 DCT coefficients $F(u,v)$ ($u=0,1, \ldots 7$, $V=0,1, \ldots 7$) corresponding to an 8 (number of horizontal pixels)×8(number of vertical pixels) sub-block, as shown in FIG. 6. Additionally, the circuit removes DCT coefficients for high horizontal frequencies from each sub-block thereby providing a DCT coefficient array $F(u,v)$ ($u=0,1, \ldots 3$, $v=0,1, \ldots 7$) consisting of 4 (horizontal frequency direction u)×8(vertical frequency direction v) DCT coefficients, as shown in FIG. 6.

Figure 6:
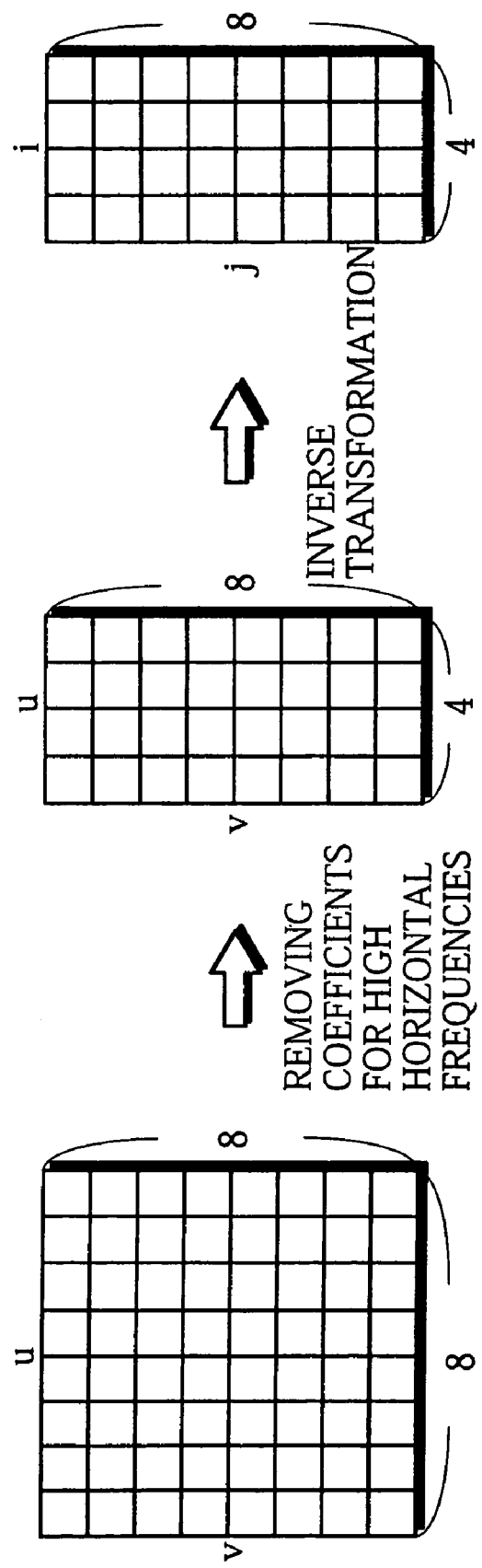
FIG. 6 is a schematic diagram showing DCT coefficients from which those for high horizontal spatial frequencies have been removed by a high-horizontal-frequency coefficient removing circuit and data inversely transformed by an inverse DCT circuit.
Figure 7:
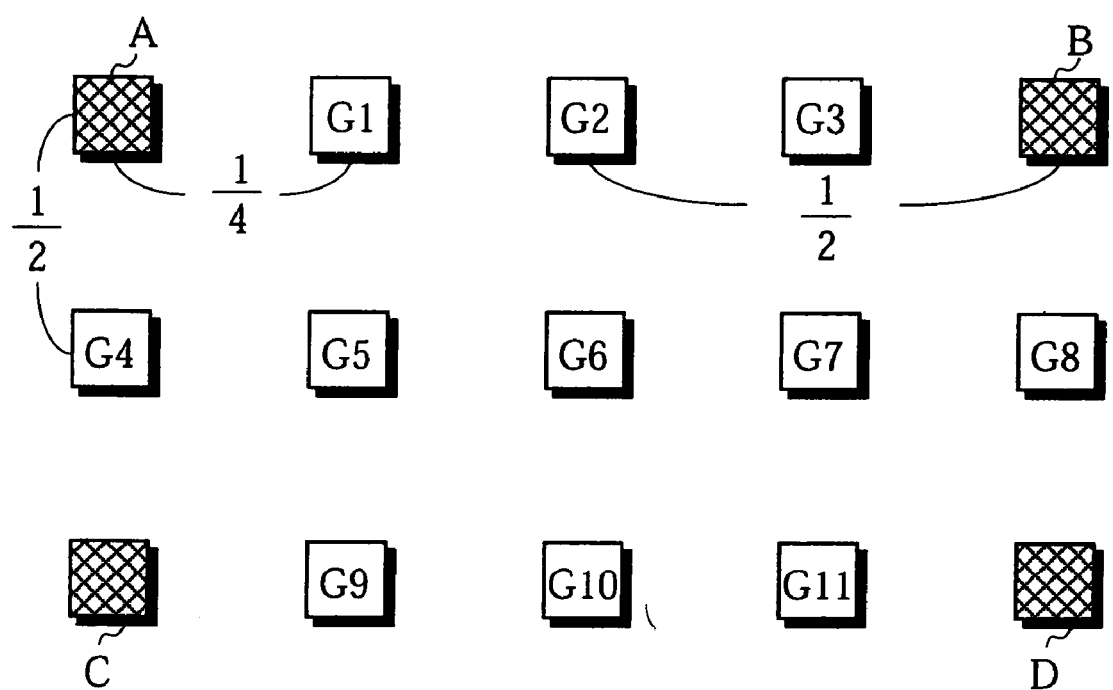
FIG. 7 is a schematic diagram for illustrating a motion compensation operation performed by motion compensation circuits 10, 11.

An inverse DCT circuit 4 performs an 4×8 inverse DCT operation represented by the following equation (16) on the 4×8 DCT coefficients produced by the high-horizontal-frequency coefficient removing circuit 3, thereby generating a data array f (i,j) (i=0,1, ... 3, j=0,1, ... 7) consisting of 4(number of horizontal pixels)×8(number of vertical pixels) data pieces, the data array horizontally compressed to ½ of the original data sub-block, as shown in FIG. 6.

$$f(i, j) = \frac{1}{4} \cdot \sum_{u=0}^{3} \sum_{v=0}^{7} C(u)C(v)F(u, v) \times \cos\left\{\frac{(2i + 1)u\pi}{8}\right\}\cos\left\{\frac{(2j + 1)v\pi}{16}\right\} \quad (16)$$

wherein $i, u = 0, 1, 2, 3$ $j, v = 0, 1, 2, \ldots 7$ $$C(u), C(v) = \begin{cases} 1/\sqrt{2} & (u = 0 \text{ or } v = 0) \\ 1 & (u \neq 0, v \neq 0) \end{cases}$$

The inverse DCT circuit further generates an 8×16 reconstructed image data macroblock or prediction error data macroblock, which is horizontally compressed to ½, by using four image data sub-blocks thus obtained, which sub-blocks constitute one macroblock. Accordingly, an amount of the data macroblock provided by the inverse DCT circuit 4 accounts for a half of an image data macroblock for the original picture.

An adder 5 processes the 8×16 prediction error data macroblock, horizontally compressed to ½ and generated by the inverse DCT circuit 4, by adding thereto reference image data (8×16 reference image data macroblock horizontally compressed to ½) according to a macroblock type of the prediction error data macroblock, thus generating reconstructed image data. The reference image data is sent to the adder 5 via a switch 13. It is to be noted that when the inverse DCT circuit 4 outputs reconstructed image data for predictive intraframe coding, no reference image data is added.

Where the 8×16 reconstructed image data macroblock horizontally compressed to half, which is provided by the inverse DCT circuit 4 or the adder 5, is reconstructed image data for "B" Picture, the reconstructed image data is sent to a switch 6.

Where the reconstructed image data macroblock provided by the inverse DCT circuit 4 or the adder 5 is reconstructed image data for "I" or "P" Picture, the reconstructed image data is committed to storage at the first reference image memory 8 or the second reference image memory 9 via a switch 7. Thus, an amount of image data stored in the first reference image memory 8 or the second reference image memory 9 accounts for ½ of that stored in the prior-art memory. The switch 7 is controlled by the CPU 20.

The first motion compensation circuit 10 and the second motion compensation circuit 11 each perform a motion compensation operation on the reference image read from the reference image memory 8 or 9 by using the motion vector supplied from the vector-value conversion circuit 15. Now, description will be made on the motion compensation operation performed by the first and second motion compensation circuits 10, 11.

Respective values G1 to G11 of predicted pixels G1 to G11 are calculated by using the following equations (17) wherein A to D denote pixel values A to D of four neighboring pixels A to D included in the image read from the reference image memory 8 or 9.

$$G1 = \frac{3}{4}A + \frac{1}{4}B \quad (17)$$

$$G2 = \frac{1}{2}A + \frac{1}{2}B$$

$$G3 = \frac{1}{4}A + \frac{3}{4}B$$

$$G4 = \frac{1}{2}A + \frac{1}{2}C$$

$$G5 = \frac{3}{8}A + \frac{1}{8}B + \frac{3}{8}C + \frac{1}{8}D$$

$$G6 = \frac{1}{4}A + \frac{1}{4}B + \frac{1}{4}C + \frac{1}{4}D$$

$$G7 = \frac{1}{8}A + \frac{3}{8}B + \frac{1}{8}C + \frac{3}{8}D$$

$$G8 = \frac{1}{2}B + \frac{1}{2}D$$

$$G9 = \frac{3}{4}C + \frac{1}{4}D$$

$$G10 = \frac{1}{2}C + \frac{1}{2}D$$

$$G11 = \frac{1}{4}C + \frac{3}{4}D$$

This allows the motion compensation operation to be performed on the image horizontally compressed to ½ with a horizontal accuracy of ¼ pel and a vertical accuracy of ½ pel. Since a distance between horizontally adjoining pixels in the image horizontally compressed to ½ accounts for two pixels in real terms and hence, an actual horizontal accuracy of the motion compensation is ½ pel. As a result, the motion compensation operation has the actual accuracies of ½ pel with respect to both the horizontal and vertical directions.

An averaging section 12 averages the image data provided by the first motion compensation circuit 10 and the second motion compensation circuit 11 for generation of 8×16 reference image data macroblock used for the interpolative/predictive interframe coding.

The switch 13 is controlled by the CPU 20 in the following manner. When the inverse DCT circuit 4 outputs reconstructed image data for predictive intraframe coding, a common terminal of the switch 13 is switched to an earth terminal.

When the inverse DCT circuit 4 outputs prediction error data for forward predictive interframe coding or for backward predictive interframe coding, the common terminal of the switch 13 is switched to select either a terminal for receiving reference image data from the first motion compensation circuit 10 or a terminal for receiving reference image data from the second motion compensation circuit 11.

When the inverse DCT circuit 4 outputs prediction error data for interpolative/predictive interframe coding, the common terminal of the switch 13 is switched to select a terminal for receiving an output of the averaging section 12.

The switch 6 is controlled by the CPU 20 in a manner to output the reconstructed image data for "B" Picture sent from the adder 5, the reconstructed image data for "I" or "P" Picture stored in the first reference image memory 8, and the reconstructed image data for "I" or "P" Picture stored in the second reference image memory 9 in an order corresponding to the original picture. The image data outputted from the switch 6 is converted by a format conversion circuit 16 into a format such as to correspond to a monitor device in the numbers of the horizontal and vertical scanning lines and thereafter, supplied to the monitor device.

According to the description of the above embodiment, the image horizontally compressed to ½ relative to the original picture is produced as the reference image. However, the invention is also applicable to a case where an image horizontally compressed to m/8 (m=1,2, . . . 7) relative to the original picture is produced as the reference image.

In order to produce the reference image horizontally compressed to m/8 relative to the original picture, the vector-value conversion circuit 15 processes the motion vector supplied from the variable length decoder 14 such that the horizontal value of the motion vector is reduced to m/8 of its initial value. The motion compensation circuits 10, 11 each perform the motion compensation operation with an accuracy of m/16 of a distance between horizontally adjoining pixels in the image horizontally compressed to m/8. This provides a horizontal accuracy of the motion compensation at ½ pel in real terms.

Likewise, the invention is also applicable to a vertical image compression process in order to produce a reference image vertically compressed to n/8 (n=1,2, . . . 7) relative to the original picture. In addition, the invention is also applicable to the production of a reference image compressed from the original picture with respect to both the horizontal and vertical directions.

With regard to the production of the image by compressed relative to the original picture with respect to either one or both of the horizontal and vertical directions, the following methods are usable: a method including the steps of removing a part of the DCT coefficients and performing the inverse DCT operation; and a method including the steps of replacing a part of the DCT coefficients with "0", performing the inverse DCT operation, and performing a line deletion operation.

[2] Second Embodiment

Now referring to FIGS. 8 to 10, description will be made on an embodiment wherein the invention is applied to the MPEG decoder.

Figure 8:
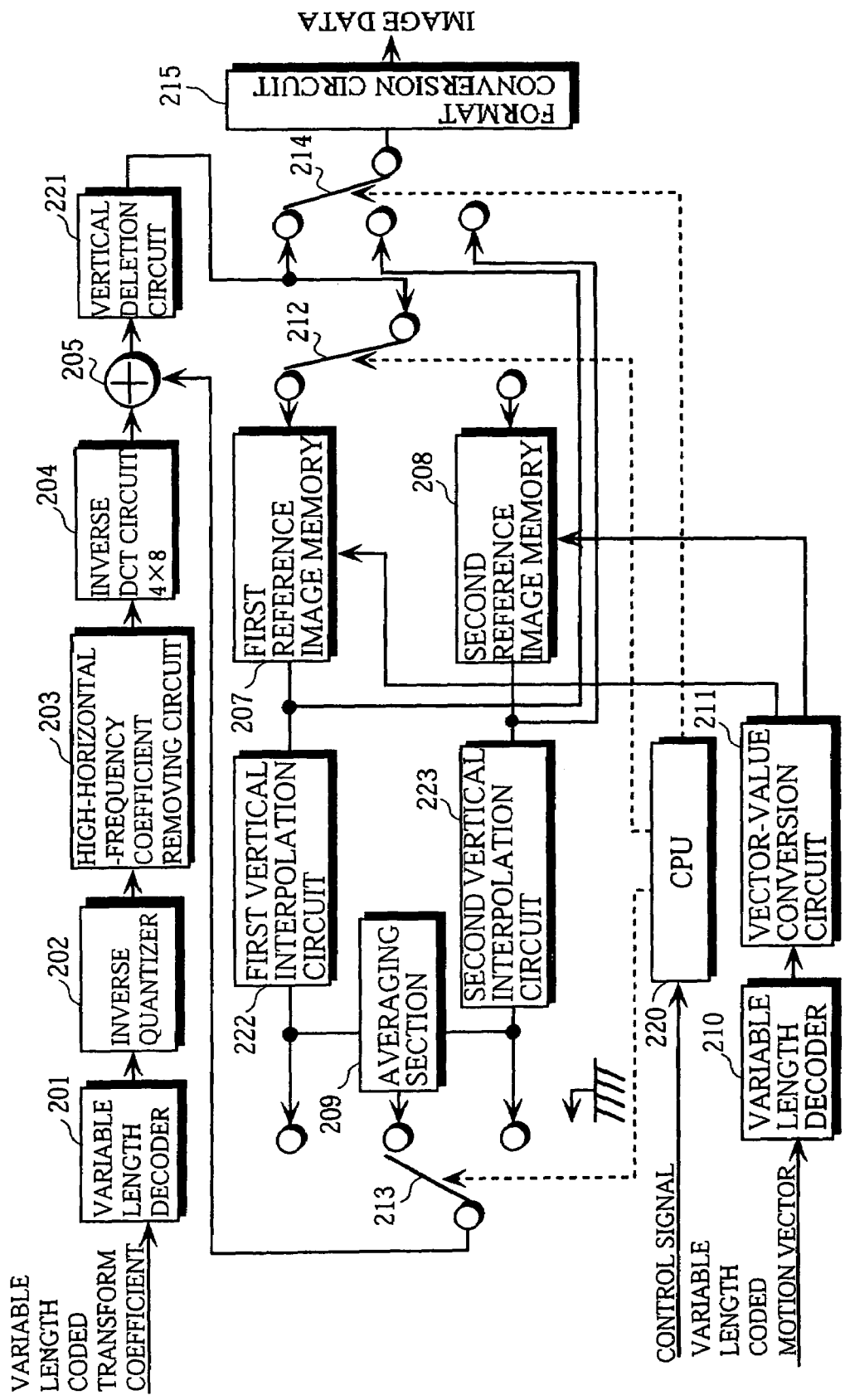
FIG. 8 is a block diagram showing a construction of an MPEG decoder according to a second embodiment of the invention.

FIG. 8 diagrammatically illustrates a construction of an MPEG decoder.

The variable length coded transform coefficient is sent to a variable length decoder 201. The control signal inclusive of the macroblock type is sent to a CPU 220. The variable length coded motion vector is sent to a variable length decoder 210 to be decoded. The motion vector provided by the variable length decoder 210 is represented in half pels rather than in full pels.

The motion vector provided by the variable length decoder 210 is sent to a vector-value conversion circuit 211 which, in turn, processes the motion vector to reduce a horizontal value and a vertical value thereof to ½, respectively. The motion vector, the horizontal and vertical values of which are each reduced to ½ by the vector-value conversion circuit 211, is supplied to a first reference image memory 207 and a second reference image memory 208 as the control signal for controlling a slicing position of the reference image.

The variable length decoder 201 serves to decode the variable length coded transform coefficient. An inverse quantizer 202 inversely quantizes the transform coefficient (quantized DCT coefficient) supplied by the variable length decoder 201 thereby transforming the coefficient back to the DCT coefficient. A high-horizontal-frequency coefficient removing circuit (coefficient reducing circuit) 203 transforms the DCT coefficient sequence produced by the inverse quantizer 202 back to 8×8 DCT coefficients F(u,v) (u=0,1, . . . 7, v=0,1, . . . 7) corresponding to the 8(number of horizontal pixels)×8(number of vertical pixels) sub-block, as shown in FIG. 9. Additionally, the circuit removes DCT coefficients for high horizontal frequencies from each sub-block thereby providing the DCT coefficient array F(u,v) (u=0,1, . . . 3, v=0,1, . . . 7) consisting of 4(horizontal frequency direction u)×8(vertical frequency direction v) DCT coefficients, as shown in FIG. 9.

Figure 9:
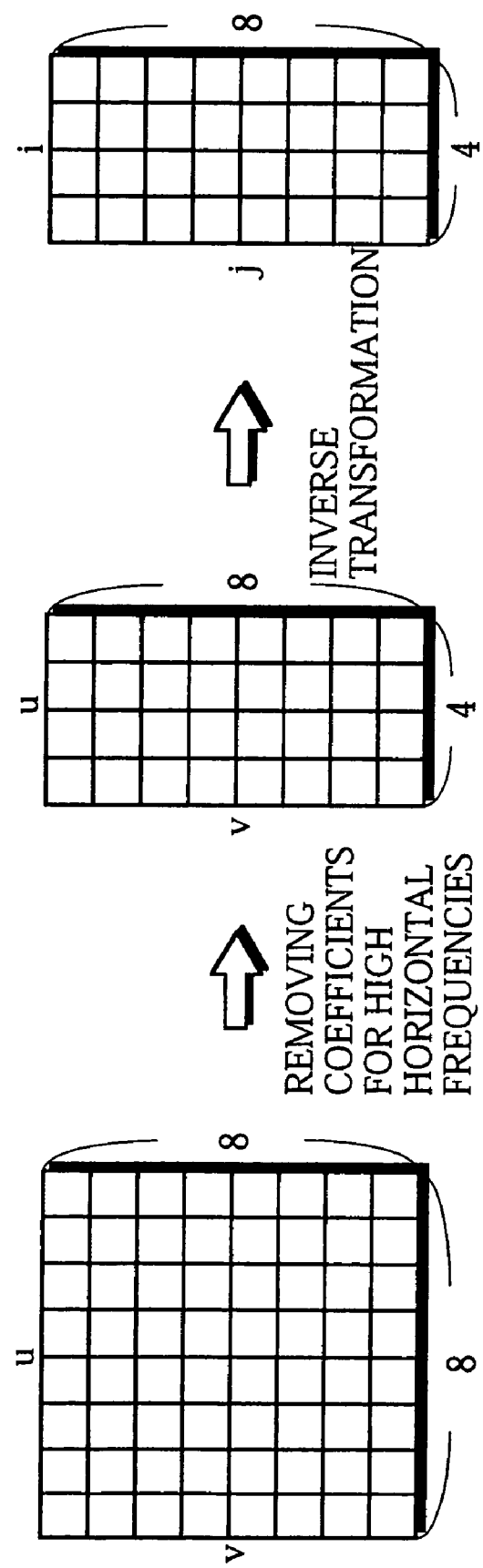
FIG. 9 is a schematic diagram showing the DCT coefficients from which those for high horizontal spatial frequencies have been removed by the high-horizontal-frequency coefficient removing circuit and data inversely transformed by the inverse DCT circuit.
Figure 10:
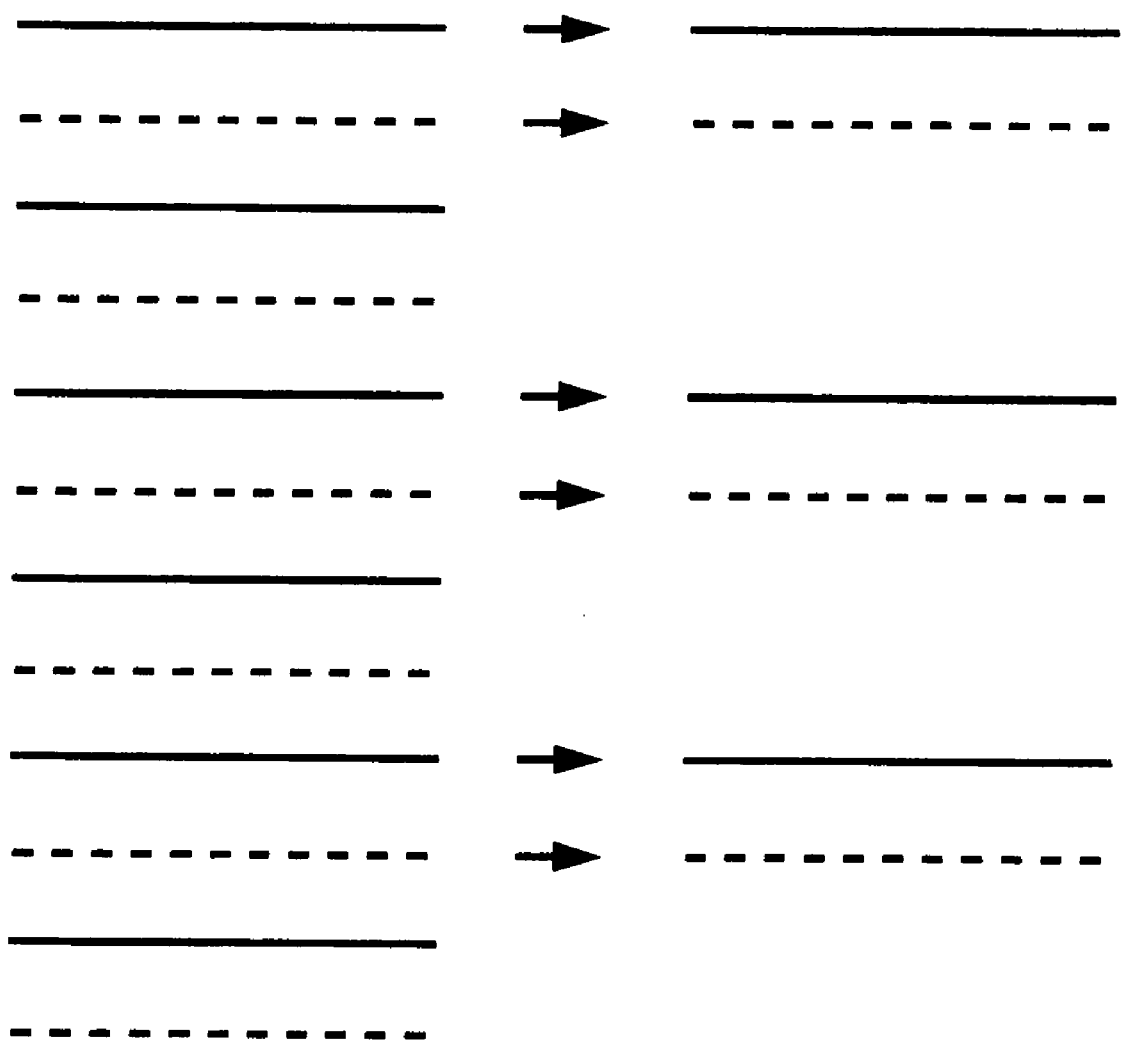
FIG. 10 is a schematic diagram for illustrating a line deletion process performed by a vertical deletion circuit.

An inverse DCT circuit 204 performs a 4×8 inverse DCT operation represented by the following equation (18) on the 4×8 DCT coefficients thus produced by the high-horizontal-frequency coefficient removing circuit 203, thereby generating a data array f(i,j) (i=0,1, . . . 3, v=0,1, . . . 7) consisting of 4(number of horizontal pixels)×8(number of vertical pixels) data pieces, the data array horizontally compressed to ½ from the initial data sub-block, as shown in FIG. 9.

$$f(i, j) = \frac{1}{4} \cdot \sum_{u=0}^{3} \sum_{v=0}^{7} C(u)C(v)F(u, v) \times \cos\left\{\frac{(2i+1)u\pi}{8}\right\}\cos\left\{\frac{(2j+1)v\pi}{16}\right\} \quad (18)$$

wherein $i, u = 0, 1, 2, 3$ $j, v = 0, 1, 2, \cdots 7$ $$C(u), C(v) = \begin{cases} 1/\sqrt{2} & (u = 0 \text{ or } v = 0) \\ 1 & (u \neq 0, v \neq 0) \end{cases}$$

The inverse DCT circuit further generates the 8×16 reconstructed image data macroblock or prediction error data macroblock, which is horizontally compressed to ½, by using four image data sub-blocks thus obtained, which sub-blocks constitute one macroblock. Accordingly, an amount of the data macroblock provided by the inverse DCT circuit 204 accounts for a half of the image data macroblock for the original picture.

An adder 205 processes the 8×16 prediction error data macroblock, horizontally compressed to ½ by the inverse DCT circuit 204, by adding thereto reference image data (8×16 reference image data macroblock horizontally compressed to ½) according to its macroblock type, thus generating reconstructed image data. The reference image data is sent to the adder 205 via a switch 213. It is to be noted that when the inverse DCT circuit 204 outputs reconstructed image data for predictive intraframe coding, no reference image data is added.

The 8×16 reconstructed image data macroblock horizontally compressed to ½, which is provided by the inverse DCT circuit 204 or the adder 205, is sent to a vertical deletion circuit 221. In the 8×16 reconstructed image data macroblock provided by the inverse DCT circuit 204 or the adder 205, horizontal lines (represented by solid lines) of an odd field and horizontal lines (represented by broken lines) of an even field alternately appear along the vertical direction, as shown in the left-hand part of FIG. 10. Therefore, the line deletion operation is performed on a basis of two successive horizontal lines in order to ensure that the data include the horizontal lines of the odd field and of the even field in an alternating fashion, as shown in the right-hand part of FIG. 10.

This converts the 8×16 reconstructed image data macroblock horizontally compressed to ½ into the 8×8 reconstructed image data macroblock compressed to ½ with respect to both the horizontal and vertical directions. Hence, the image data macroblock provided by the vertical deletion circuit 221 has a data amount reduced to ¼ of that of the image data macroblock for the original picture.

Where the vertical deletion circuit 221 provides a reconstructed image data macroblock for "B" Picture, the reconstructed image data is sent to a switch 214.

Where the vertical deletion circuit 221 provides a reconstructed image data macroblock for "I" or "P" Picture, the reconstructed image data is committed to storage at the first reference image memory 207 or the second reference image memory 208 via a switch 212. The amount of image data stored in the first reference image memory 207 or the second reference image memory 208 accounts for ¼ of that stored in the prior-art memory. The switch 212 is controlled by the CPU 220.

A first vertical interpolation circuit 222 performs a vertical interpolation operation on the 8×8 reference image data macroblock read from the first reference image memory 207 or interpolates the horizontal lines deleted by the vertical deletion circuit 221, thereby generating a 8×16 reference image data macroblock.

A second vertical interpolation circuit 223 performs the vertical interpolation operation on the 8×8 reference image data macroblock read from the second reference image memory 208 or interpolates the horizontal lines deleted by the vertical deletion circuit 221, thereby generating a 8×16 reference image data macroblock.

An averaging section 209 averages the image data read from the first vertical interpolation circuit 222 and the second vertical interpolation circuit 223 for generation of 8×16 reference image data macroblock for interpolative/predictive interframe coding.

The switch 213 is controlled by the CPU 220 in the following manner. When the inverse DCT circuit 204 outputs reconstructed image data for predictive intraframe coding, a common terminal of the switch 213 is switched to an earth terminal.

When an output from the inverse DCT circuit 204 is prediction error data for forward predictive interframe coding or for backward predictive interframe coding, the common terminal of the switch 213 is switched to select either a terminal for receiving the reference image data from the first vertical interpolation circuit 222 or a terminal for receiving the reference image data from the second vertical interpolation circuit 223.

In the reading of the reference image from the reference image memory 207 or 208, a slicing position of the reference image is controlled based on the motion vector supplied from the vector-value conversion circuit 211. The reason why the horizontal and vertical values of the motion vector are respectively reduced to ½ by the vector-value conversion circuit 211 is because the image data macroblock supplied from the vertical deletion circuit 221 to the reference image memories 207, 208 is compressed to ½ with respect to both the horizontal and vertical directions.

When an output from the inverse DCT circuit 204 is prediction error data for interpolative/predictive interframe coding, the common terminal of the switch 213 is switched to select a terminal for receiving the output of the averaging section 209.

The switch 214 is controlled by the CPU 220 in a manner to output the reconstructed image data for "B" Picture sent from the vertical deletion circuit 221 to the switch 214, the reconstructed image data for "I" or "P" Picture stored in the first reference image memory 207, and the reconstructed image data for "I" or "P" Picture stored in the second reference image memory 208 in an order corresponding to the original picture. The image data outputted from the switch 214 is converted by a format conversion circuit 215 into a format such as to correspond to the monitor device in the numbers of the horizontal and vertical scanning lines and thereafter, supplied to the monitor device.

Similar compensation circuits to the motion compensation circuits 10, 11 (see FIG. 5) of the aforementioned first embodiment may be provided downstream of the first vertical interpolation circuit 222 and of the second vertical interpolation circuit 223, respectively.

The above embodiment permits the use of the first and second reference image memories 207, 208 each having a capacity of ¼ of that of the memory employed by the prior art.

There may be contemplated a process for generating data horizontally and vertically compressed to ½, respectively, wherein, not only coefficients for high horizontal frequencies but also for high vertical frequencies are removed from the 8×8 transform coefficient sub-block provided by the inverse quantizer 202. That is, a 4×4 inverse transform operation is performed by using only 4×4 transform coefficients for low horizontal frequencies and low vertical frequencies thereby generating the data compressed to ½ with respect to both the horizontal and vertical directions. Similarly to the aforementioned embodiment hereof, this reduces the memory requirements for the first reference memory 207 and the second reference memory 208 to ¼ of those for the prior-art memory.

However, in a case where the inverse transform operation is performed on the 4×4 block left after the removal of the coefficients for the high horizontal frequencies and for the low vertical frequencies, image degradation occurs because of confusion between the space axis and the time axis if the image to be decoded is an interlaced image. For the purpose of preventing such image degradation, the above embodiment is arranged such that the inverse transform operation is performed on the 4×8 block left after the removal of only the coefficients for high horizontal frequencies(or maintaining the coefficients for high vertical frequencies) and is followed by the vertical deletion operation.

[3] Third Embodiment

Now referring to FIGS. 11 to 16, description will be made on an embodiment wherein the invention is applied to the MPEG decoder and more particularly, on a decoding process for Y signal.

Figure 11:
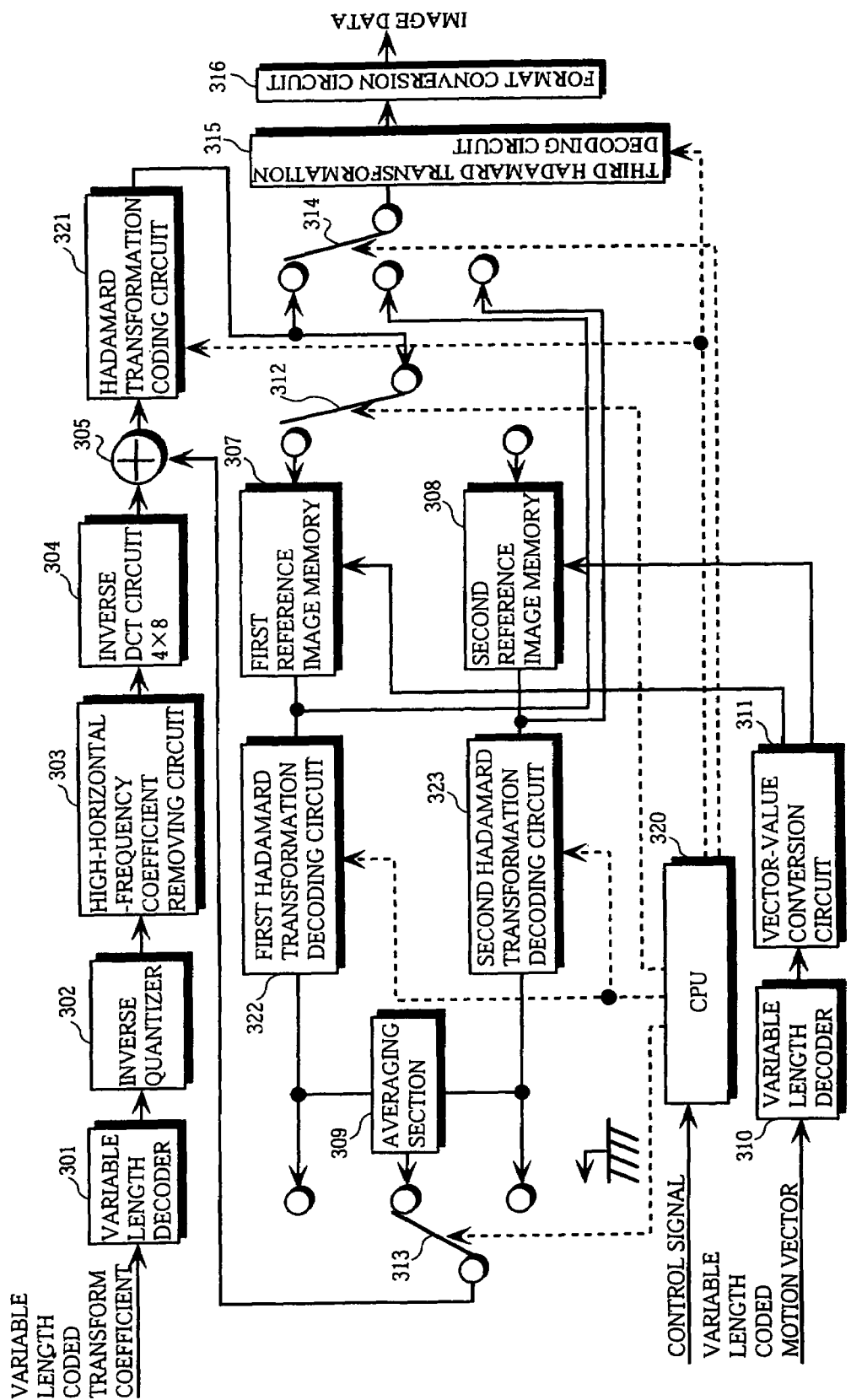
FIG. 11 is a block diagram showing a construction of an MPEG decoder according to a third embodiment of the invention.

FIG. 11 diagrammatically illustrates a construction of an MPEG decoder.

The variable length coded transform coefficient is sent to a variable length decoder 301 whereas the control signal inclusive of the macroblock type is sent to a CPU 320. The variable length coded motion vector is sent to a variable length decoder 310 to be decoded. The motion vector provided by the variable length decoder 310 is represented in half pels rather than in full pels.

The motion vector provided by the variable length decoder 310 is sent to a vector-value conversion circuit 311 which, in turn, processes the motion vector to reduce a horizontal value thereof to ½. The motion vector, the horizontal value of which is reduced to ½ by the vector-value conversion circuit 311, is sent to a first reference image memory 307 and a second reference image memory 308 as the control signal for controlling a slicing position of the reference image.

Figure 12:
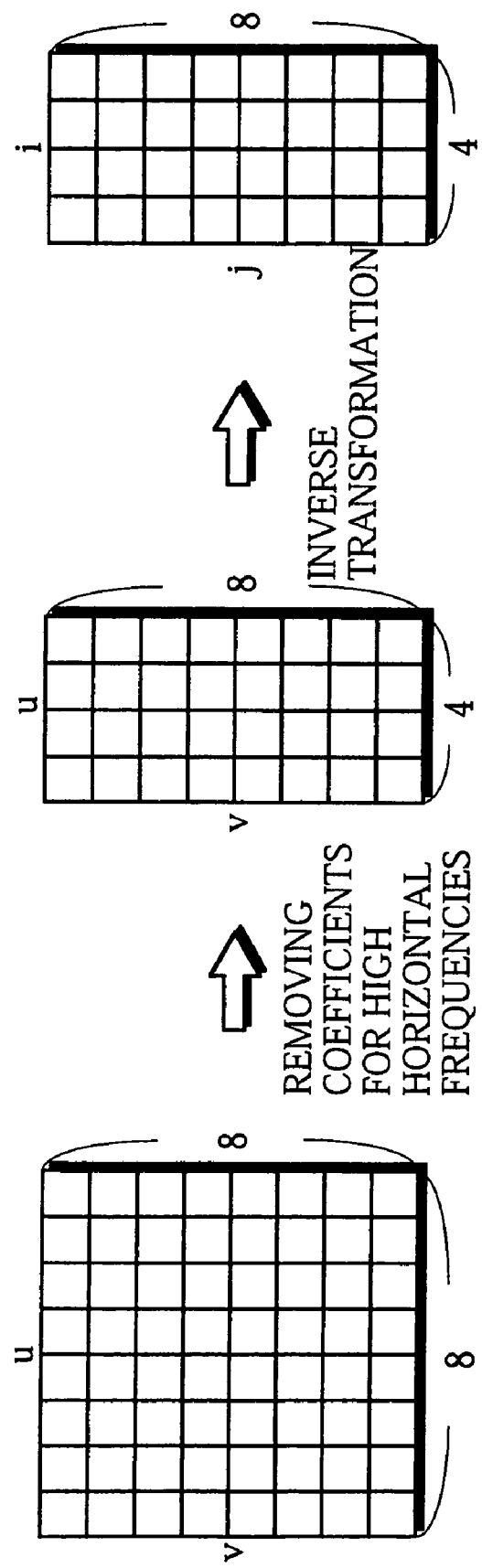
FIG. 12 is a schematic diagram showing the DCT coefficients from which those for high horizontal spatial frequencies have been removed by the high-horizontal-frequency coefficient removing circuit and data inversely transformed by the inverse DCT circuit.

The variable length decoder 301 serves to decode the variable length coded transform coefficient. An inverse quantizer 302 inversely quantizes the transform coefficient (quantized DCT coefficient) supplied by the variable length decoder 301 thereby transforming the coefficient back to the DCT coefficient. A high-horizontal-frequency coefficient removing circuit (coefficient reducing circuit) 303 transforms the DCT coefficient sequence produced by the inverse quantizer 302 back to 8×8 DCT coefficients F(u,v) (u=0,1, . . . 7, v=0,1, . . . 7) corresponding to the 8(number of horizontal pixels)×8(number of vertical pixels) sub-block, as shown in FIG. 12. Additionally, the circuit removes DCT coefficients for high horizontal frequencies from each sub-block thereby providing the DCT coefficient array F(u,v) (u=0,1, . . . 3, v=0,1, . . . 7) consisting of 4 (horizontal frequency direction u)×8(vertical frequency direction v) DCT coefficients, as shown in FIG. 12.

An inverse DCT circuit 304 performs a 4×8 inverse DCT operation represented by the following equation (19) on the 4×8 DCT coefficient array thus produced by the high-horizontal-frequency coefficient removing circuit 303, thereby generating a data array f(i,j) (i=0,1, . . . 3, v=0,1, . . . 7) consisting of 4(number of horizontal pixels)×8(number of vertical pixels) data pieces, which data array is horizontally compressed to ½ of the initial data sub-block, as shown in FIG. 12.

$$f(i, j) = \frac{1}{4} \cdot \sum_{u=0}^{3} \sum_{v=0}^{7} C(u)C(v)F(u, v) \times$$

$$\cos\left\{\frac{(2i+1)u\pi}{8}\right\}\cos\left\{\frac{(2j+1)v\pi}{16}\right\}$$

wherein $i, u = 0, 1, 2, 3$ $j, v = 0, 1, 2, \cdots 7$ $C(u), C(v) = \begin{cases} 1/\sqrt{2} & (u = 0 \text{ or } v = 0) \\ 1 & (u \neq 0, v \neq 0) \end{cases}$ The inverse DCT circuit further generates the 8×16 reference image data macroblock or prediction error data macroblock, which is horizontally compressed to ½, by using four image data sub-blocks thus obtained, the four sub-blocks constituting one macroblock. Accordingly, the data macroblock provided by the inverse DCT circuit 304 has a data amount reduced to ½ of the image data macroblock for the original picture.

An adder 305 processes the 8×16 prediction error data macroblock, horizontally compressed to ½ by the inverse DCT circuit 304, by adding thereto reference image data (8×16 reference image data macroblock horizontally compressed to ½) according to the macroblock type thereof, thus generating reconstructed image data. The reference image data is sent to the adder 305 via a switch 313. It is to be noted here that when the inverse DCT circuit 304 outputs reference image data for predictive intraframe coding, no reference image data is added.

An 8×16 first reconstructed image data macroblock, which is horizontally compressed to ½ and provided by the inverse DCT circuit 304 or the adder 305, is sent to an Hadamard transformation coding circuit 321.

The Hadamard transformation coding circuit 321 performs 4-D Hadamard transformation and quantization. The Hadamard transformation coding circuit 321 divides the 8×16 reconstructed image data macroblock into blocks.

Where the input image signal represents an interlaced image, the first reconstructed image data is divided into 2×2 blocks, each consisting of four pixels. In the block, each pair of pixels horizontally adjoin to each other in each of the two successive odd-numbered lines or of the two successive even-numbered lines, as shown in FIG. 13*a*.

Where the input image data represents a progressively scanned image, the first reconstructed image data is divided into 2×2 blocks, each consisting of four pixels. In the block, each pair of pixels horizontally adjoin to each other in each of the vertically adjoining two lines, as shown in FIG. 13*b*. The block forming operations are responsive to the control signal from the CPU 320 so as to be switched according to the type of the input image signal.

Figure 13D:
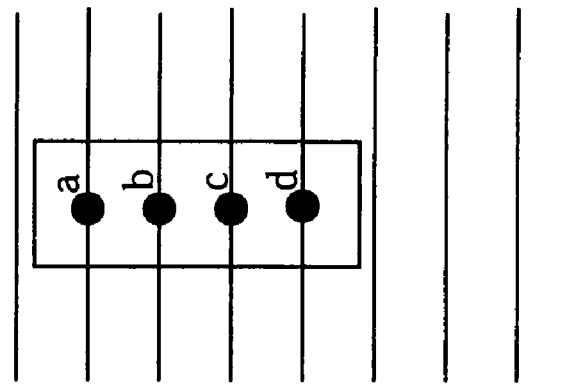
FIG. 13a to 13d are schematic diagrams for illustrating a block forming process for Hadamard Transform operation.
Figure 13C:
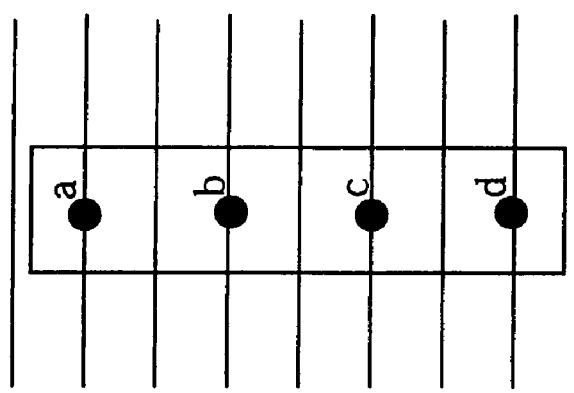
Figure 13B:
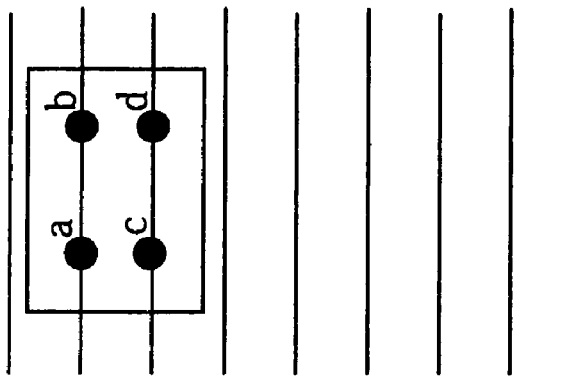

Alternatively, the first reconstructed image may be divided into 4×1 blocks, each block including vertically adjoining four pixels, as shown in FIG. 13*d*, when the progressively scanned image is inputted. When, on the other hand, the interlaced image is inputted, the first reconstructed image may be divided into the 2×2 blocks shown in FIG. 13*a*. Otherwise, when the interlaced image is inputted, the first reconstructed image may be divided into 4×1 blocks, each block consisting of four pixels vertically corresponding to each other and respectively included in four successive odd-numbered lines or in four successive even-numbered lines, as shown in FIG. 13*c*.

Figure 13A:
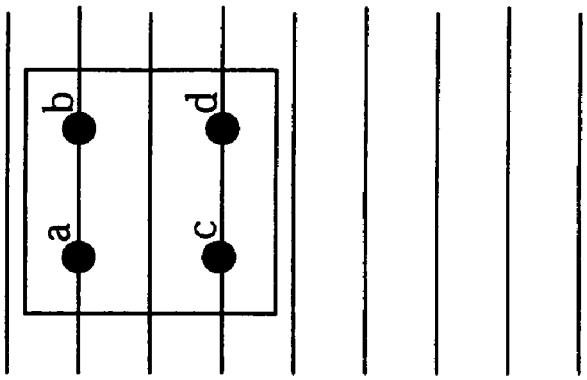

An Hadamard transform operation is performed on a block-by-block basis by using the following equation (20) wherein "a" to "d" each denote a pixel value (8 bits) of each pixel of the block, as shown in FIG. 13*a* or 13*b*:

$$K0 = \frac{1}{4}(a+b+c+d)$$

$$K1 = \frac{1}{4}(a-b+c-d)$$

$$K2 = \frac{1}{4}(a+b-c-d)$$

$$K3 = \frac{1}{4}(a-b-c+d)$$

Although the Hadamard transform operation actually uses a coefficient of $1/(4 \times 2^{1/2})$, the coefficient is assumed to be ¼ herein to facilitate the explanation on the transform operation.

Subsequently, the quantization operation is performed. For accomplishing ½ data compression with respect to a direction of bitstream, 16 bits are assigned to a total pixel value of the four pixels included in one block.

There may be contemplated three types of methods 1 to 3 for assigning a number of bits to respective coefficients K0, K1, K2 and K3, as shown in the following table 1. This embodiment adopts the method 1.

TABLE 1

|     | K0     | K1     | K2     | K3     |
|-----|--------|--------|--------|--------|
| (1) | 8 bits | 4 bits | 4 bits | 0 bit  |
| (2) | 8 bits | 0 bit  | 4 bits | 4 bits |
| (3) | 8 bits | 3 bits | 3 bits | 2 bits |

Specifically, 8 bits are assigned to the coefficient K0. On the other hand, 4 bits are assigned to K1 and K2, respectively while 0 bit is assigned to K3. Therefore, a value given by the above equation (20) is directly applied to K0. K3 is ignored regardless of the result of the above equation (20).

As to the coefficients K1 and K2, 8 bit values (−128 to +127) given thereto by the above equation (20) are converted into 4 bit values (−8 to +7), respectively, based on a quantization/dequantization table shown in FIG. 14. In columns of Hadamard Coefficient K and Dequantized Value (representative value) K" of the table shown in FIG. 14, parenthesized numerals denote values for color difference signal C (Cb, Cr signals) and unparenthesized numerals denote values for luminance signal Y.

In the case of the method 3 shown in Table 1, the values of the 8-bit coefficients K1 and K2 are respectively converted into 3-bit values (quantized value) based on a quantization/dequantization table shown in FIG. 15. On the other hand, the value of the 8-bit coefficient K3 is converted into a 2-bit value (quantized value) based on a quantization/dequantization table, for example, shown in FIG. 16. In columns of Coefficient K and Dequantized Value K" of the tables shown in FIGS. 15 and 16, parenthesized numerals denote values for the color difference signal C (Cb, Cr signals) whereas unparenthesized numerals denote values for the luminance signal Y.

It is herein provided that the quantized values of K0, K1 and K2 are represented by K0', K1' and K2', respectively. The combination of the aforesaid 4-D Hadamard transform operation and quantization operation provides 8×16 macroblocks of second reconstructed image data. An amount of the second reconstructed image data accounts for ½ of that of the first reconstructed image data. Therefore, an amount of the second reconstructed image data macroblock accounts for ¼ of that of the image data macroblock for the original picture.

Where the second reconstructed image data macroblock provided by the Hadamard transformation coding circuit 321 is reconstructed image data for "B" Picture, the reconstructed image data is sent to a switch 314.

Where the second reconstructed image data macro block provided by the Hadamard transformation coding circuit 321 is reconstructed image data for "I" or "P" Picture, the reconstructed image data is committed to storage at a first reference image memory 307 or a second reference image memory 308 via a switch 312. An amount of the image data stored in the first reference image memory 307 or the second reference image memory 308 accounts for ¼ of that stored in the prior-art memory. The switch 312 is controlled by the CPU 320.

A first Hadamard transformation decoding circuit 322 performs an inverse quantization operation and inverse Hadamard transform operation on the 8×16 macroblock of second reconstructed image data read from the first reference image memory 307, thereby generating reference image data corresponding to the first reconstructed image.

First, the quantized values K0', K1' and K2', composing the second reconstructed image data read from the first reference image memory 307 are respectively converted into dequantized values K0", K1" and K2". Specifically, the inversely quantized value K0" for K0' is equal to K0'.

The inversely quantized values K1" and K2" for K1' and K2' are respectively determined based on the quantization/dequantization table shown in FIG. 14. Where the second reconstructed image data read from the first reference image memory 307 is reconstructed image data for the luminance signal (Y signal), values corresponding to K1' and K2' are respectively chosen, as the inversely quantized values K1" and K2", from the inversely quantized values for Y signal shown in the quantization/dequantization table of FIG. 14. Where the reconstructed image data read from the first reference image memory 307 is reconstructed image data for the color difference signal C (Cb, Cr signals), values corresponding to K1' and K2' are respectively chosen, as the inversely quantized values K1" and K2", from the inversely quantized values for the C signal shown in the quantization/dequantization table of FIG. 14.

The inverse Hadamard transform operation is performed by applying the inversely quantized values K0", K1" and K2" thus obtained to the following equation (21) wherein K3" is regarded as 0:

$$a' = (K0''+K1''+K2''+K3'')$$

$$b' = (K0''-K1''+K2''-K3'')$$

$$c' = (K0''+K1''-K2''-K3'') \quad (21)$$

$$d' = (K0''-K1''-K2''+K3'')$$

Thus, the 8×16 macroblock of second reconstructed image data read from the first reference image memory 307 is converted into the reference image data macroblock corresponding to the first reconstructed image data macroblock.

A second Hadamard transformation decoding circuit 323 performs similar operations to the aforesaid inverse quantization operation and Hadamard transform operation on the 8×16 macroblock of reconstructed image data read from the second reference image memory 308, thereby generating a reference image data macroblock in correspondence to the first reconstructed image data macroblock.

An averaging section 309 averages the image data read from the first Hadamard transformation decoding circuit 322 and the second Hadamard transformation decoding circuit 323, thereby generating an 8×16 reference image data macroblock for interpolative/predictive interframe coding.

The switch 313 is controlled by the CPU 320 in the following manner. When the inverse DCT circuit 304 outputs the reconstructed image data for predictive intraframe coding, a common terminal of the switch 313 is switched to an earth terminal.

When the inverse DCT circuit 304 outputs the prediction error data for forward predictive interframe coding or for backward predictive interframe coding, the common terminal of the switch 313 is switched to select either a terminal for receiving the reference image data from the first Hadamard transformation decoding circuit 322 or a terminal for receiving the reference image data from the second Hadamard transformation decoding circuit 323.

In the reading of the reference image from the reference image memory 307 or 308, a slicing position of the reference image is controlled based on the motion vector supplied from the vector-value conversion circuit 311. A reason why the vector-value conversion circuit 311 reduces the horizontal value of the motion vector to ½ is because the image data macroblock supplied from the Hadamard transformation coding circuit 321 to the reference image memories 307, 308 is horizontally compressed to ½.

When the inverse DCT circuit 304 outputs the prediction error data for interpolative/predictive interframe coding, the common terminal of the switch 313 is switched to select a terminal for receiving the output from the averaging section 309.

The switch 314 is controlled by the CPU 320 in a manner to output the second reconstructed image data for "B" Picture sent from the Hadamard transformation coding circuit 321 to the switch 314, the second reconstructed image data for "I" or "P" Picture stored in the first reference image memory 307, and the second reconstructed image data for "I" or "P" Picture stored in the second reference image memory 308 in an order corresponding to the original picture.

The second reconstructed image data outputted from the switch 314 is processed by a third Hadamard transformation decoding circuit 315 with similar operations to the aforesaid inverse quantization operation and inverse Hadamard transform operation and thus is converted into image data corresponding to the first reconstructed image data. Subsequently, the converted image data is sent to a format conversion circuit 316.

The format conversion circuit 316, in turn, converts the image data supplied from the third Hadamard transformation decoding circuit 315 into such a format as to correspond to the monitor device in the numbers of the horizontal and vertical scanning lines. Subsequently, the image data in the converted format is supplied to the monitor device.

Similar motion compensation circuits to the motion compensation circuits 10, 11 of the aforementioned first embodiment may be provided downstream of the first Hadamard transformation decoding circuit 322 and the second Hadamard transformation decoding circuit 323, respectively.

The above embodiment permits the use of the first and second reference image memories 307, 308 each having a capacity of ¼ of that of the memory conventionally employed.

There may be contemplated a process in which the coefficients not only for high horizontal frequencies but also for high vertical frequencies are removed from each 8×8 transform coefficient sub-block provided by the inverse quantizer 302 and the 4×4 inverse transform operation is performed by using only the resultant 4×4 transform coefficients for low horizontal and vertical frequencies thereby generating data compressed to ½ with respect to both the horizontal and vertical directions, respectively. Similarly to the aforementioned embodiments hereof, this reduces the memory requirements for the first reference memory 307 and the second reference memory 308 to ¼ of those for the memories conventionally employed.

However, in a case where the 4×4 block based inverse transform operation is performed subsequent to the removal of the coefficients for high horizontal frequencies and high vertical frequencies, image degradation occurs because of confusion between the space axis and the time axis of the image data when the interlaced image is decoded. For the purpose of preventing such image degradation, the above embodiment is arranged such that only the coefficients for high horizontal frequencies are removed to leave the coefficients for high vertical frequencies preparatory to the 4×8 block based inverse transform operation which is followed by the Hadamard transformation-based coding operation.

According to the above embodiment, the inverse DCT operation, preceded by the partial removal of the DCT coefficients, is performed to provide the image, which is used for producing the first reconstructed image. Alternatively, the normal inverse DCT operation (8×8 IDCT), preceded by no partial removal of the DCT coefficients, may be performed to provide the image, which is used for producing the first reconstructed image and then, the resultant first reconstructed image is subject to the Hadamard transformation-based coding operation.

Otherwise, the normal inverse DCT operation (8×8 IDCT), preceded by no partial removal of the DCT coefficients, may be performed to provide the image which is used for producing the first reconstructed image and subsequently, the resultant first reconstructed image may be subject to at least one of the horizontal and the vertical deletion operations which is followed by the Hadamard transformation-based coding operation.

According to the above embodiment, the inverse DCT operation, preceded by the partial removal of the DCT coefficients, is performed to provide the image which is used for producing the first reconstructed image. Alternatively, subsequent to replacing a part of the DCT coefficients with "0", the inverse DCT operation (8×8 IDCT) may be performed to provide the image which is used for producing the first reconstructed image and subsequently, the resultant first reconstructed image may be subject to the Hadamard transformation-based coding operation.

Otherwise, subsequent to replacing a part of the DCT coefficients with "0", the inverse DCT operation (8×8 IDCT) may be performed to provide the image which is used for producing the first reconstructed image and subsequently, the resultant first reconstructed image may be subject to at least one of the horizontal and the vertical deletion operations which is followed by the Hadamard transformation-based coding operation.

The invention claimed is:

1. A motion picture decoding apparatus comprising:
   a coefficient reducing circuit for removing orthogonal transform coefficients for high horizontal frequencies from a certain sized block of orthogonal transform coefficients obtained from an input signal, thereby reducing the number of transform coefficients to half;
   an inverse orthogonal transformation circuit for performing an inverse orthogonal transform operation by using the transform coefficients reduced by the coefficient reducing circuit, thereby obtaining, on a block-by-block basis, first reconstructed image data or time-axis prediction error data horizontally compressed to ½;
   an adder for generating first reconstructed image data horizontally compressed to ½, based on the time-axis prediction error data provided by the inverse orthogonal transformation circuit and on predetermined reference image data;
   an Hadamard transformation coding circuit for quantizing, based on Hadamard transformation, the first reconstructed image data provided by the inverse orthogonal transformation circuit or the adder, thereby generating second reconstructed image data, the amount of which data is reduced bitwise to ½ from that of the first reconstructed image data; and
   one or more than one reference image memories for storing second reconstructed image data which is included in the second reconstructed image data provided by the Hadamard transformation coding circuit and is needed for generating the reference image data,
   the motion picture decoding apparatus wherein the second reconstructed image data stored in the reference image memory is used for generating the reference image data corresponding to the first reconstructed image data.

2. A motion picture decoding apparatus as set forth in claim 1 wherein said certain sized block is based on an M×N block unit including an M number of horizontal pixels and an N number of vertical pixels, and wherein the inverse orthogonal transformation circuit performs the inverse orthogonal transform operation based on the following equation (j) provided that an original picture has been encoded by an orthogonal transform operation based on the following equation (i):

$$F(u, v) = \frac{2}{\sqrt{M}\sqrt{N}} \cdot C(u)C(v) \sum_{i=0}^{M-1} \sum_{j=0}^{N-1} f(i, j) \times \qquad \text{(i)}$$
$$\cos\left\{\frac{(2i+1)u\pi}{2M}\right\}\cos\left\{\frac{(2j+1)v\pi}{2N}\right\}$$

wherein $i, u = 0, 1, 2, \cdots (M-1)$ $j, v = 0, 1, 2, \cdots (N-1)$ $C(u), C(v) = \begin{cases} 1/\sqrt{2} & (u = 0 \text{ or } v = 0) \\ 1 & (u \neq 0, v \neq 0) \end{cases}$ $$f(i, j) = \frac{2}{\sqrt{M}\sqrt{N}} \cdot \sum_{u=0}^{\frac{M}{2}-1} \sum_{v=0}^{N-1} C(u)C(v)F(u, v) \times \qquad \text{(j)}$$
$$\cos\left\{\frac{(2i+1)u\pi}{2 \cdot M/2}\right\}\cos\left\{\frac{(2j+1)v\pi}{2N}\right\}$$

wherein $i, u = 0, 1, 2, \cdots (M/2 - 1)$ $j, v = 0, 1, 2, \cdots (N-1)$ $C(u), C(v) = \begin{cases} 1/\sqrt{2} & (u = 0 \text{ or } v = 0) \\ 1 & (u \neq 0, v \neq 0) \end{cases}$ 3. A motion picture decoding apparatus as set forth in claim 1 wherein said certain sized block is based on an 8×8 block unit including 8 horizontal pixels and 8 vertical pixels, and wherein the inverse orthogonal transformation circuit performs the inverse orthogonal transform operation based on the following equation (1) provided that an original picture has been encoded by an orthogonal transform operation based on the following equation (k):

$$F(u, v) = \frac{1}{4} \cdot C(u)C(v) \sum_{i=0}^{7} \sum_{j=0}^{7} f(i, j) \times \qquad \text{(k)}$$
$$\cos\left\{\frac{(2i+1)u\pi}{16}\right\}\cos\left\{\frac{(2j+1)v\pi}{16}\right\}$$

wherein $i, u = 0, 1, 2, \cdots 7$ $j, v = 0, 1, 2, \cdots 7$ $C(u), C(v) = \begin{cases} 1/\sqrt{2} & (u = 0 \text{ or } v = 0) \\ 1 & (u \neq 0, v \neq 0) \end{cases}$ $$f(i, j) = \frac{1}{4} \cdot \sum_{u=0}^{3} \sum_{v=0}^{7} C(u)C(v)F(u, v) \times \qquad \text{(l)}$$
$$\cos\left\{\frac{(2i+1)u\pi}{8}\right\}\cos\left\{\frac{(2j+1)v\pi}{16}\right\}$$

wherein $i, u = 0, 1, 2, 3$ $j, v = 0, 1, 2, \cdots 7$ $C(u), C(v) = \begin{cases} 1/\sqrt{2} & (u = 0 \text{ or } v = 0) \\ 1 & (u \neq 0, v \neq 0) \end{cases}$ 4. A motion picture decoding apparatus as set forth in claim 1 further comprising a motion compensation circuit for performing a motion compensation operation on image data of a certain size with a horizontal accuracy of ¼ pel and a vertical accuracy of ½ pel, the image data read from the reference image memory for generation of the reference image data and horizontally compressed to ½ relative to an original picture.

5. A motion picture decoding process for decoding a signal compression coded based on the MPEG Standards, the process comprising the steps of:

a first step of generating first reconstructed image data based on image data obtained through an inverse DCT operation or on a combination of said obtained image data and reference image data;

a second step of performing an Hadamard transformation-based coding operation on the first reconstructed image data thereby generating second reconstructed image data, the amount of which data is reduced bitwise from that of the first reconstructed image data;

a third step of committing second reconstructed image data to storage at a reference image memory, which reconstructed image data is included in the second reconstructed image data provided by the second step and is needed for generating the reference image data; and a fourth step of generating the reference image data corresponding to the first reconstructed image data by using the second reconstructed image data stored in the reference image memory.

6. A motion picture decoding process for decoding a signal compression coded based on the MPEG Standards, the process comprising the steps of:

a first step of generating first reconstructed image data based on image data obtained through an inverse DCT operation using DCT coefficients, a part of which coefficients has been removed, or on a combination of said obtained image data and reference image data;

a second step of performing an Hadamard transformation-based coding operation on the first reconstructed image data thereby generating second reconstructed image data, the amount of which data is reduced bitwise from that of the first reconstructed image data;

a third step of committing second reconstructed image data to storage at a reference image memory, which reconstructed image data is included in the second reconstructed image data provided by the second step and is needed for generating the reference image data; and a fourth step of generating the reference image data corresponding to the first reconstructed image data by using the second reconstructed image data stored in the reference image memory.

7. A motion picture decoding process for decoding a signal compression coded based on the MPEG Standards, the process comprising the steps of:

a first step of generating first reconstructed image data based on image data obtained through an inverse DCT operation using DCT coefficients, a part of which coefficients has been replaced with "0", or on a combination of said obtained image data and reference image data;

a second step of performing an Hadamard transformation-based coding operation on the first reconstructed image data thereby generating second reconstructed image data, the amount of which data is reduced bitwise from that of the first reconstructed image data;

a third step of committing second reconstructed image data to storage at a reference image memory, which reconstructed image data is included in the second reconstructed image data provided by the second step and is needed for generating the reference image data; and a fourth step of generating the reference image data corresponding to the first reconstructed image data by using the second reconstructed image data stored in the reference image memory.

8. A motion picture decoding process for decoding a signal compression coded based on the MPEG Standards, the process comprising the steps of:
   a first step of generating first reconstructed image data based on image data obtained through an inverse DCT operation or on a combination of said obtained image data and reference image data;
   a second step of generating second reconstructed image data by subjecting the first reconstructed image data to at least one of a horizontal deletion processing and a vertical deletion processing;
   a third step of performing an Hadamard transformation-based coding operation on the second reconstructed image data thereby generating third reconstructed image data, the amount of which data is reduced bitwise from that of the second reconstructed image data;
   a fourth step of committing third reconstructed image data to storage at a reference image memory, which reconstructed image data is included in the third reconstructed image data provided by the third step and is needed for generating the reference image data; and
   a fifth step of generating the reference image data corresponding to the first reconstructed image data by using the third reconstructed image data stored in the reference image memory.

9. A motion picture decoding process for decoding a signal compression coded based on the MPEG Standards, the process comprising the steps of:
   a first step of generating first reconstructed image data based on image data obtained through an inverse DCT operation using DCT coefficients, a part of which coefficients has been removed, or on a combination of said obtained image data and reference image data;
   a second step of generating second reconstructed image data by subjecting the first reconstructed image data to at least one of a horizontal deletion processing and a vertical deletion processing;
   a third step of performing an Hadamard transformation-based coding operation on the second reconstructed image data thereby generating third reconstructed image data, the amount of which data is reduced bitwise from that of the second reconstructed image data;
   a fourth step of committing third reconstructed image data to storage at a reference image memory, which reconstructed image data is included in the third reconstructed image data provided by the third step and is needed for generating the reference image data; and
   a fifth step of generating the reference image data corresponding to the first reconstructed image data by using the third reconstructed image data stored in the reference image memory.

10. A motion picture decoding process for decoding a signal compression coded based on the MPEG Standards, the process comprising the steps of:
    a first step of generating first reconstructed image data based on image data obtained through an inverse DCT operation using DCT coefficients, a part of which coefficients has been replaced with "0", or on a combination of said obtained image data and reference image data;
    a second step of generating second reconstructed image data by subjecting the first reconstructed image data to at least one of a horizontal deletion processing and a vertical deletion processing;
    a third step of performing an Hadamard transformation-based coding operation on the second reconstructed image data thereby generating third reconstructed image data, the amount of which data is reduced bitwise from that of the second reconstructed image data;
    a fourth step of committing third reconstructed image data to storage at a reference image memory, which reconstructed image data is included in the third reconstructed image data provided by the third step and is needed for generating the reference image data; and
    a fifth step of generating the reference image data corresponding to the first reconstructed image data by using the third reconstructed image data stored in the reference image memory.

* * * * *